United States Patent
Handa

[11] Patent Number: 6,147,764
[45] Date of Patent: Nov. 14, 2000

[54] OPTICAL INTERFERENCE PROFILER HAVING SHADOW COMPENSATION

[75] Inventor: Hirohisa Handa, Ibaraki, Japan

[73] Assignee: Mitutoyo Corporation of Kamiyokoba, Kawasaki, Japan

[21] Appl. No.: 09/283,813

[22] Filed: Mar. 31, 1999

[30] Foreign Application Priority Data

| | | | |
|---|---|---|---|
| Apr. 3, 1998 | [JP] | Japan | 10-091085 |
| Apr. 3, 1998 | [JP] | Japan | 10-108657 |
| Apr. 9, 1998 | [JP] | Japan | 10-097174 |

[51] Int. Cl.[7] .................................................. G01B 9/02
[52] U.S. Cl. ..................................... 356/512; 356/514
[58] Field of Search .................................... 356/359, 360, 356/357

[56] References Cited

U.S. PATENT DOCUMENTS 5,999,264  12/1999  Handa ..................................... 356/359

FOREIGN PATENT DOCUMENTS 9-273908  10/1997  Japan .
11-14305  1/1999  Japan .

OTHER PUBLICATIONS

Yatagai, "Recent Advances in Optical Interference Measurement Methods", Precision Machinery 51/4/1985, p. 65–72.

Nagahama, "Absolute Measurement of Surface Contours Using Interferometers", Lecture text for 16th Symposium on Optics (1991), Lecture No. 3, p. 55–58).

*Primary Examiner*—Samuel A. Turner
*Attorney, Agent, or Firm*—Cantor Colburn LLP

[57] ABSTRACT

In machining such as lapping and polishing, the detection of interference fringes is carried out during the machining, and an interference fringe image of a size sufficient to determine the surface profile is obtained. The workpiece is mounted on a machining mechanism base, and a lapping tool mounted on the workpiece is rotated. The lapping tool has a measurement window and an interferometer is provided above the workpiece via the lapping tool. The interferometer captures plural interference fringe images at different positions of the measurement window, each including fringe images of the measurement window areas and shadow images of the areas obstructed by the lapping tool. The shadow images are eliminated from the interference fringe images on the basis of the reference value for the optical intensity of the shadow image, and the fringe images of the measurement window areas are synthesized to form consecutive synthesized interference fringe images for a wide range of interference fringes.

14 Claims, 24 Drawing Sheets

IMAGE AFTER 90 IMAGES HAVE BEEN SYNTHESIZED

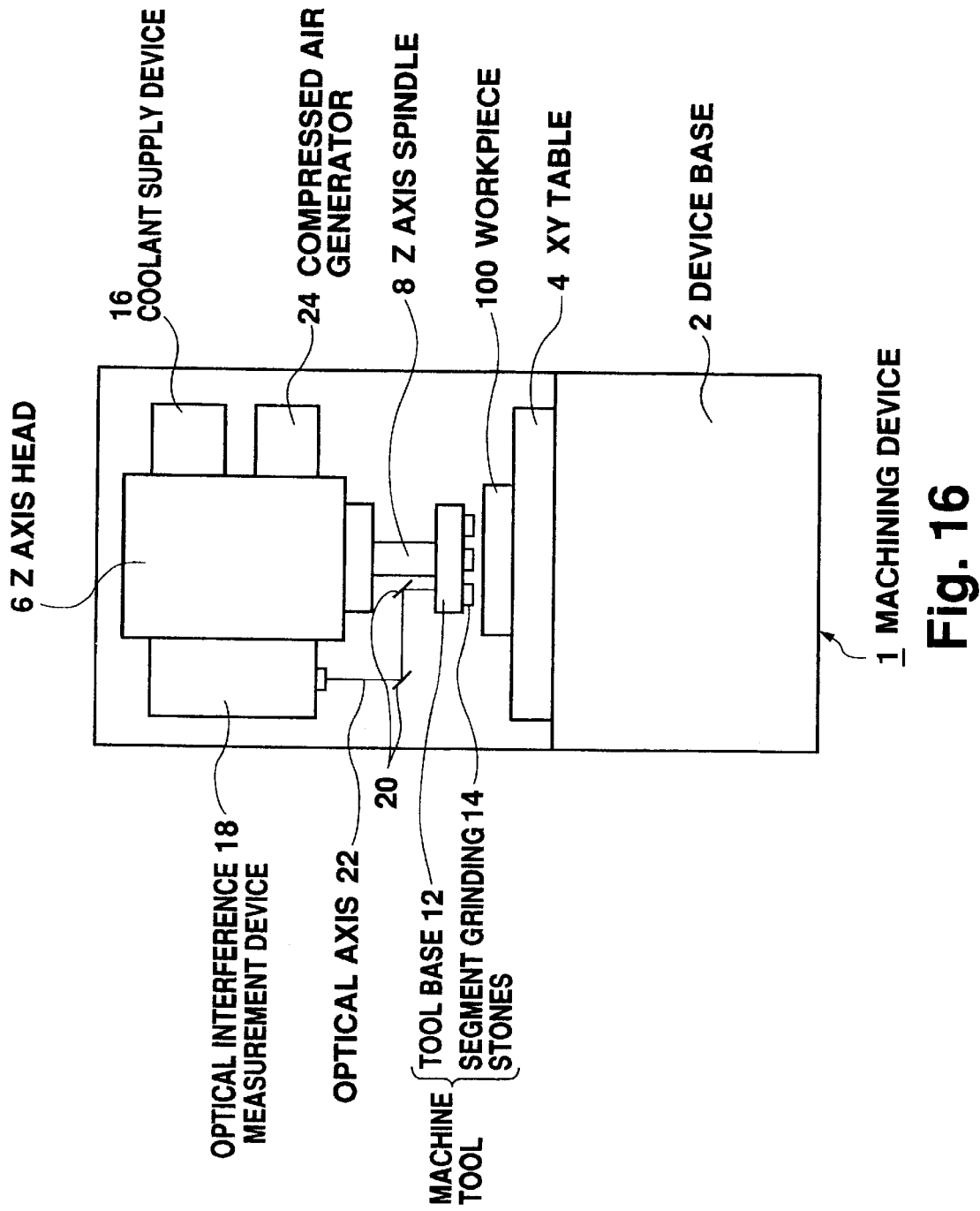

DRAWING OF BOTTOM VIEW

WORKPIECE 100

(VIEW FROM X DIRECTION)

OPTICAL INTERFERENCE PROFILER HAVING SHADOW COMPENSATION

BACKGROUND OF THE INVENTION

1. Field of the Invention

The present invention relates to an on-the-fly optical interference measurement device for measuring a workpiece being machined, and more particularly, relates to a device in which consecutive satisfactory interference fringe images can be obtained over a wide interference fringe range. The present invention can be suitably applied to measurements while abrasive work such as lapping or polishing is being performed. The present invention also relates to a machining device provided with a measurement device as outlined above.

2. Description of the Related Art

In order to precisely finish a gauge block or a similar item, machining such as lapping, polishing, or the like is often performed using abrasive particles. With this machining method, a machine tool (such as a lapping machine) which serves as a reference and the workpiece are pressed against each other and moved relative to each other. As the workpiece and the working tool slide against each other, abrasive particles are introduced between the workpiece and the working tool. Such systems employing abrasive particles include both liberated abrasive systems and fixed abrasive systems. In a liberated abrasive system, a working fluid in which the fluid and the particles have been mixed is supplied between the machine tool and the workpiece. In a fixed abrasive system, the abrasive particles are embedded in the sliding surface of the machine tool. This second method of machining is suitable for precise finishing of surfaces, and is commonly applied, for example, to the machining of gauge blocks or other precision components, the machining of optical components such as lenses and mirrors, and precise finishing of components such as semiconductor wafers.

To measure the accuracy of surfaces or dimensions of an abrasively machined workpiece, a measurement device is used for optical detection of interference fringes. Well-known measurement devices include those such as the Fizeau interferometer, and measurement is usually performed by utilizing an image of the interference fringes formed in accordance with the surface contour of the workpiece. Optical interference measurement technology is described in documents such as, for example, "Absolute Measurement of Surface Contours Using Interferometers" (Nagahama, Lecture text for 16th Symposium on Optics (1991), Lecture No. 3, p. 55–58). Another publication, "Recent Advances in Optical Interference Measurement Methods" (Yatagai, Precision Machinery 51/4/1985, p. 65–72) describes a device for automatically determining the flatness as the surface contour, using image processing of interference fringes.

However, in the known systems, when a workpiece is set on a polishing machine, because the workpiece is covered by the machine tool, measurement cannot be performed while machining is in progress (on-the-fly measurement). As a result, the workpiece is usually removed from the machine and cleaned before being set on the measurement device, with measurement then being performed.

Generally, high machining precision in the micron to sub-micron range is required when lapping and polishing finishing is being used. When high precision is required, the workpiece is again machined after it has been cleaned and then measured. The repeated process of machining, cleaning and measuring the workpiece until the required precision is achieved is extremely intricate and complicated and machining costs for highly accurately machined parts, particularly optical components and gauges, tend to be exceptionally high.

It is therefore conventionally necessary to interrupt the lapping or polishing, remove the workpiece from the machine, and measure the contour, and this has served to inhibit improvements in productivity and machining accuracy. Given these conditions, there is a call for methods by which interference fringes in surface contours can be detected after the workpiece has been set in place on the machine, even while machining is in progress.

It is particularly desirable to find a way in which interference fringes can be detected, not only while machining is in progress, but also in which consecutive interference fringes can be obtained appropriately over a wide area. Using interference fringes from a narrow area, it is possible, but extremely difficult, to judge the surface contour through visual inspection. However, calculating surface accuracy using image processing and other means requires consecutive interference fringes in a sufficiently broad area.

The above describes an example of a conventional technical problem which occurs in abrasive machining. The problem described above, however, is not limited to abrasive machining. It is also not possible to detect interference fringes of the surface being machined using optical means, while machining is in progress in types of machining other than abrasive machining.

SUMMARY OF THE INVENTION

An object of the present invention is to provide an optical interference measurement device capable of precisely measuring the surface contour of a workpiece on-the-fly, i.e., while machining is in progress and which permits obtaining consecutive interference fringes over a sufficiently broad area.

Another object of the present invention is to provide a suitable machining device which is equipped with the measurement device described above.

The present invention is directed to an optical interference measurement device for optically measuring an interference of a target workpiece to be held in a machining device and machined by a machine tool, said optical interference measurement device comprising: a machine tool having a measurement window which penetrates the machine tool; interference image formation means for irradiating the machine tool with measurement light from the side opposite to the workpiece to capture a plurality of optical interference images which are present in the range including said measurement window and which have different positional relationships between the workpiece and the measurement window; and image processing means for synthesizing the fringe images of the workpiece obtained in the measurement window area of said plural optical interference images to form a synthesized interference fringe image in which the interference fringe images are consecutive within a predetermined measurement range; said image processing means eliminating the shadow of the machine tool from the optical interference image on the basis of a reference tool shadow intensity which is the reference size of the optical intensity of the tool shadow corresponding to the tool section in the optical interference image to form said synthesized interference fringe image.

Preferably, the above-mentioned image processing means utilizes, among picture elements in the identical position of said plural optical interference images, a picture element which has an optical intensity offset from said reference tool shadow intensity as the picture element constituting said synthesized interference fringe image. For example, the picture element might be a pixel. Alternatively, an element with any other desired unit, such as a compilation of a plurality of pixels, may also be applied as the picture element of the present invention.

Furthermore, the above-mentioned image processing means may utilize, among picture elements in the identical position of said plural optical interference images, a picture element which has an optical intensity at the largest distance from said reference tool shadow intensity as the picture element constituting said synthesized interference fringe image.

According to the present invention as described above, the workpiece is visible through the measurement window in the machine tool, and hence the interference image formation means can capture optical interference images by directing the measurement light at the machine tool and using the principle of the interferometer. This optical interference image includes not only the fringe image of the workpiece captured through the measurement window, but also images of the tool (tool shadow), that is the image portion other than the measurement window. However, because the tool shadow has its own inherent optical intensity, a fringe image can be extracted by eliminating areas having the reference tool shadow intensity corresponding to this inherent optical intensity from the optical interference image. As a result, it is possible to obtain a synthesized interference fringe image incorporating the fringe images from the measurement window areas, from plural optical interference images having different positional relationships between the workpiece and the measurement window, based on the reference tool shadow intensity.

Japanese Patent Laid-open Publication No. H9-273908 describes an optical measurement device for obtaining measurement data over a wide range linking plural items of measurement data. In the device described in that publication, however, the various items of measurement data are effective over the entire range, and the process only entails aligning adjacent measurement data. In the present invention, on the other hand, the various optical interference images include valid components (fringe images) and invalid components (tool shadows). Using the present invention, it is possible to construct an interference fringe image for a broad range even in such cases.

The above-mentioned reference tool shadow intensity may be uniformly set over the entire optical interference image; the standard range of the values obtained for the optical intensity of the tool shadow be set as the standard shadow intensity range; and the image processing means utilize an image element of one reference image among the plurality of optical interference images as the picture element constituting the synthesized interference image, in the event that the picture elements of identical sections of the plural optical interference images are all included in the reference shadow intensity range.

With such a configuration, because the reference tool shadow intensity is uniformly set over the entire optical interference image, synthesis processing can be easily performed by the image processing means. In real situation, however, the tool shadow intensity has its own distribution and inclination, and is not consistent over the entire optical interference image. Because of this influence, if a uniform reference tool shadow intensity is used, it is unlikely that it will be possible to obtain a natural synthesized interference image. With this aspect as described above, however, in the event that any of the image elements of identical areas of the plural optical interference images are included in the reference shadow intensity range described above, the picture element from one standard image is used to construct the synthesized interference image. In such a way, it is always possible to obtain a natural synthesized interference image.

It may also preferable for the above-mentioned reference tool shadow intensity to be set separately for the respective sections of the optical interference image, and wherein judgment as to whether or not each picture element of the each section of the optical interference image is to be used for the synthesized interference image be made on the basis of the reference tool shadow intensity corresponding to this picture element. By using a different reference tool shadow intensity for each area, a synthesized interference image can be obtained without being affected by the distribution and inclination of the tool shadow intensity.

It may further be preferable for the above-mentioned image processing means to process the synthesized interference fringe image into a binary image, and then calculate the surface profile of the workpiece on the basis of the binary image. In the present invention, an adequately broad range of interference fringes can be obtained, whereby the surface profile can be calculated in an optional well-known manner by the use of these interference fringes.

Another aspect of the present invention is directed to a machining device with a measurement function which is provided with the above-mentioned optical interference measurement device to machine a workpiece by means of the relative movement of the workpiece and a machine tool. According to this aspect, the present invention is realized in the form of a machining device.

As described above, with the present invention, it is possible to measure surface contour elements such as flatness, while machining is in progress. As a result, machining (such as lapping and polishing) can be carried out with a high level of reliability. In addition, utilizing the measurement results to adjust the machining conditions of the machining device and using them in automatic adjustment of the machining conditions is ideal. By doing this, the conditions can be corrected to accommodate disparities in the skill levels of the machine operators and changes in environmental conditions, and high-precision machining can be partially, or even completely, automated.

In particular, with the present invention, consecutive interference fringes can be obtained over a range linking the fringe images from the measurement window areas, as described above. Because interference fringes can be obtained over a sufficiently broad range, more comprehensive calculation of the surface profile based on image processing using interference fringes can be carried out with greater ease.

The finishing machine applied by the measurement device of the present invention may consist of a type which drives the machine tool side, the workpiece side, or both sides. For instance, it may be a commonly-known lapping machine which rotates both the workpiece and the machine tool, with the workpiece offset from the rotation shaft of the machine tool. In such a case, if the machine tool serves as the reference, the workpiece both revolves in response to drive, and autorotates. Moreover, the finishing machine applied by the present invention is not limited to a device in which the machine tool and the workpiece rotate, but might also, for example, use linear movement for the machine tool.

Furthermore, if the measurement device of the present invention is applied to an abrasive machine, it might be either a machine with a liberated abrasive system, or a machine with a fixed abrasive system. Moreover, it might be a finishing machine which processes only one surface of the workpiece, or a finishing machine which processes plural surfaces, such as in double-sided processing.

Also, in the present invention, the workpiece is not restricted in any particular way, but might be, for example, a gauge or another precision component such as a gauge block, an optical component such as a lens or mirror, or a semiconductor wafer. The surface being machined might be a flat surface or such as when a lens is manufactured, it might be a curved surface. For instance, the surface texture can be set in a way such as the offset from a sphere.

If measurement is done using an interferometer, it is possible to measure various surface textures, such as flatness. Also, if the section being measured is visible from the measurement window, areas of the workpiece other than the surface being machined can be measured. For example, if the workpiece is a transparent material such as the glass used in lenses, interference fringes can be detected on the surface on the opposite side of the surface being machined, and it is possible that this could be used to determined the dimensional precision of the workpiece. In other examples, measurement windows and interferometers could be placed on both sides of the workpiece, enabling measurement of the dimensional precision of the workpiece. This is effective even when the workpiece is not transparent.

Furthermore, there are cases in which the surface contour of the workpiece differs according to whether machining is in progress or whether the workpiece has been removed from the finishing machine following machining. Such differences occur as a result of the specific properties of the individual workpiece and the specifications of the finishing machine, the difference in temperatures during and after machining, the pushing force during machining, and other factors. In such an example, changes which take place in the surface texture during and after machining can be estimated in advance, and machining can then be carried out while allowing for those changes.

Additionally, in the present invention, the positional relationship between the workpiece and the interferometer is an important factor. If there is offset in the positional relationship between these two items, the interference fringes may shift between the images for the synthesis, so that satisfactory results are not obtained. As outlined in the embodiments described elsewhere, positioning the workpiece on a machining stand and then locating the machine tool on top of the workpiece is advantageous in that the workpiece can be more securely supported.

BRIEF DESCRIPTION OF THE DRAWINGS

FIG. 16 is a drawing showing the machining device of the second embodiment of the present invention.

DETAILED DESCRIPTION OF THE PREFERRED EMBODIMENTS

Preferred embodiments of the present invention are described below with reference to the accompanying drawings.

Embodiment 1

A first embodiment of the present invention corresponds to Japan Patent Application H10-108657, filed on Apr. 3, 1998, to which this application claims priority under the Paris Convention.

In this embodiment, a measurement device of the present invention is applied to an abrasive machining device.

Figure 1:
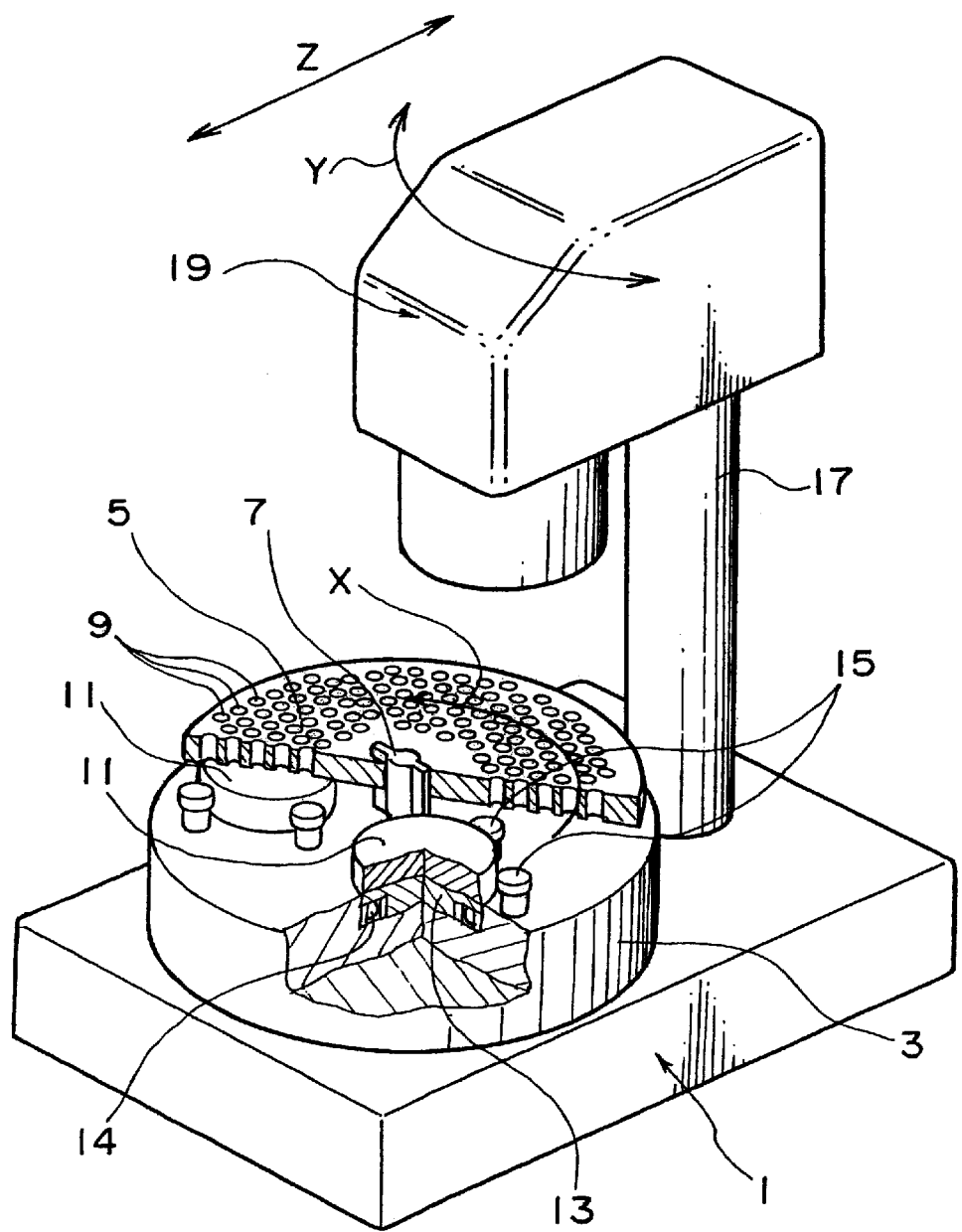
FIG. 1 is a perspective view of a lapping machine provided with a measurement device according to an embodiment of the present invention.

FIG. 1 is a perspective view of a lapping machine, in which the device is in a sectional view to facilitate understanding. The lapping machine differs from what is generally known as a "lap master system" in that the vertical positions of the lapping tool which serves as the machining tool and the workpiece have been reversed. The measurement device of the embodiment is used for measuring the flatness of a machined surface, and is integrated in the finishing machine of FIG. 1.

A cylindrical working mechanism base 3 is mounted on a device base 1. The structure of the working mechanism base 3 is substantially the same as that of the generally used upper-tray type lapping machine. A disc-shaped lapping tool 5 is mounted on top of the working mechanism base 3, and a rotation shaft 7 is fixed to the center of the lapping tool 5. The rotation shaft 7 is inserted in a vertical hole formed in the center of the working mechanism base 3, and is supported by a bearing (not shown) relative to the working mechanism base 3 in such a way that it is able to rotate. A motor is provided in the working mechanism base 3 and the rotation shaft 7 is operated by the motor so that it rotates in the counterclockwise direction (arrow X). The back surface (reference work surface) of the lapping tool 5 is parallel with the top surface of the working mechanism base 3. A feature of the first embodiment is that, as shown in FIG. 1, the lapping tool 5 is provided with a plurality of measurement windows 9. Each measurement window 9 is a circular opening formed through the lapping tool 5 in the depth direction.

Three disc-shaped workpieces 11 are positioned between the working mechanism base 3 and the lapping tool 5. The workpieces 11 are arranged at equal intervals, i.e., every 120 degrees around the rotation shaft 7 of the lapping tool 5, and are positioned at equal distances from the rotation shaft 7. Each workpiece 11 is laid on a workpiece base 13 with the same outer diameter. The workpiece base 13 is supported by an annular bearing A14 embedded in the working mechanism base 3 in such a way that it can rotate on the working mechanism base 3. Additionally, each workpiece 11 is supported at its side by two bearings B15. The two bearings B15 are arranged in such a way that the workpiece 11 and the workpiece base 13 can be held in a coaxial position. When the workpiece 11 is made to move together with the rotating lapping tool 5, the movement is inhibited by the bearings B15. In this way, the workpiece 11 is supported in a predetermined position on the working mechanism base 3 by the bearings B15 in such a way that it is able to rotate. Furthermore, although three workpieces 11 are simultaneously machined in the description of this embodiment, the number of workpieces is actually in no way limited. The workpieces 11 can be freely arranged within a range in which actual machining is not obstructed.

The lapping tool 5 is laid on top of the workpiece 11, and presses against the workpiece 11 by its own weight. As necessary, a working pressure may be applied by placing a weight on the center of the lapping tool 5. As the lapping tool 5 is rotated in the counterclockwise direction, the workpiece 11 is rotated in the same position on the working mechanism base 3. When the lapping tool 5 is used as a reference, the workpiece 11 is rotated around the rotation shaft 7, and simultaneously around the center axis of the workpiece 11.

The finishing machine of the present embodiment is of the type in which the workpiece 11 rotates autonomously in conjunction with the rotation of the lapping tool 5, and great rotation is not applied to the workpiece 11. As an example of a variation of this constitution, a mechanism such as a planetary gear drive may be used to fix the autorotation of the workpiece 11 at a determined speed.

In the present embodiment, a liberated abrasive system is used. While the lapping tool 5 is rotated, a lap fluid which serves as a working fluid is fed by being dripped onto the lapping tool 5 in a predetermined position by a lap fluid supply device (not shown). The lap fluid supply device automatically supplies a predetermined amount of lap fluid in appropriate cycles. Alternatively, a manual lap fluid supply device controlled by an operator may be used. Abrasive particles are mixed in the lap fluid. In this embodiment, since interference fringes are detected via the lap fluid, the abrasive particle size should preferably be kept small in order to suppress its influence on measurement. It is preferable to use an abrasive with a particle diameter of 1 $\mu$m or less, and in the present example, a diamond abrasive with a particle diameter of 0.25 $\mu$m is used. This lap fluid, having an appropriate viscosity, flows along the measurement windows 9 and enters a boundary face between the lapping tool 5 and the workpieces 11. In this manner, the top surfaces of the workpieces 11 are lapped and machined.

A cylindrical support rod 17 is positioned on the device base 1 next to the working mechanism base 3, and an interferometer unit 19 is attached to the support rod 17. The interferometer unit 19 is extended above the working mechanism base 3, and a tip end of the interferometer unit 19 is positioned above the workpiece 11. An interferometer is contained in the tip end for detecting interference fringes, targeting the machined surface of the workpiece 11 below it. For the interferometer, a Fizeau interferometer or another commonly-used type of interferometer may be used. In this embodiment, the interferometer radiates parallel light downward, and the light passes through the measurement windows 9 and is reflected by the machined surface of the workpiece 11. In the interferometer, an image indicative of interference fringes is formed on the basis of the reflected light. Interference fringe images are captured using a television camera built into the interferometer unit 19.

The detection range of the interferometer is generally equivalent to the size of the workpiece 11, and the opening on the underside of the interferometer unit 19 is set in conjunction with this detection range. Therefore, the interferometer generates interference fringe images for the entire range of the workpiece 11 at one time.

Furthermore, the interferometer unit 19 is rotated (arrow Y) relative to the support rod 17 and expanded/contracted in a horizontally longitudinal direction (arrow Z in the figure) by an actuator (not shown). As a result, the interferometer is capable of moving in a two-dimensional direction, and is positioned above the three workpieces 11 so that each workpiece 11 can be measured.

In order to accurately detect interference fringes with the interferometer, a uniform film of lap fluid must be formed on the machined surface in a position in which the measurement windows 9 face the workpieces 11. To obtain film uniformity, the rotation speed of the lapping tool 5 is appropriately controlled. By so doing, the interferometer can be used while machining is in progress, to detect the interference fringes of the machined surface.

Figure 2:
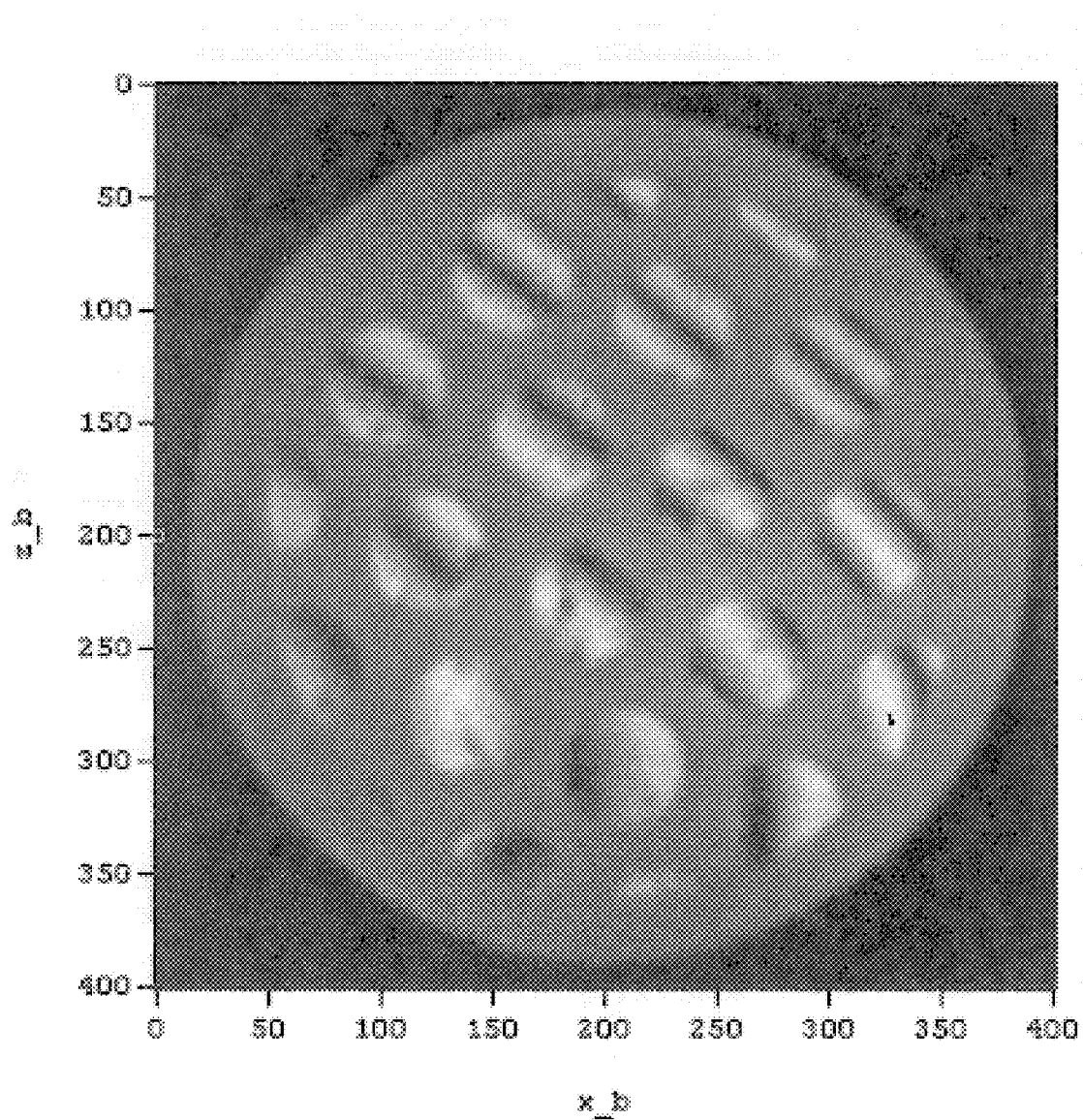
FIG. 2 is a photograph of a half-tone image showing an example of an interference image obtained using an interferometer in the device of FIG. 1.

FIG. 2 shows an example of an optical interference image captured with a television camera (CCD camera) built into the interferometer unit 19. When this image was captured, the workpiece 11 was a stainless material used for gauges. The diameter of the workpiece 11 was approximately 50 mm, and the diameters of the various measurement windows 9 were 8 mm. The lapping tool 5 was moving downward to the right of the figure at a speed of approximately 30 mm/sec. The speed of the lapping tool was appropriate to allow an appropriate length of time to elapse after the lap fluid was supplied. As a result, the lap fluid formed a stable and uniform film, as though it had been painted in a thin film over the surface of the workpiece 11. Thus, satisfactory interference fringes were detected at the measurement window sections.

The interference fringes of FIG. 2 are equivalent to those measured with the workpiece 11 removed from the machining device and measured using a conventional interferometer. consequently, in the measurement device of this embodiment, it can be said that measurement of the surface contour can be carried out with a sufficient level of accuracy.

As shown in FIG. 2, however, the optical interference image contains not only the fringe images of the measurement window areas, but the tool shadows as well. The tool shadows are the sections in which the lapping tool appears (sections other than the measurement windows). For this reason, small cylindrical fringe images are dispersed through the optical interference image. Visual confirmation of the plane precision can still be made, even with an optical interference image such as this. However, in order to calculate the plane precision using image processing of the interference fringes, it is necessary to have consecutive interference fringes over a broader range. If this image is used as is, the tool shadows pose obstructions, producing wasted effort in the process of calculating the plane precision. Given these circumstances, the process described below is used in the present invention to synthesize plural optical interference images in which the positions of the measurement window are different, and to generate interference fringes with an amply broad range to calculate the plane precision.

"Synthesis of Optical Interference Images"

Because the lapping tool is rotating, the positional relationship between the measurement window and the workpiece 11 changes constantly. The television camera incorporated into the interferometer photographs 30 frames of interference images per second. In other words, the sampling interval is ⅓₀th of a second. Consequently, during an interval of several seconds, it is possible to obtain several tens of optical interference images with the respective measurement windows in different positions. The entire workpiece 11 is covered by the window portions of these numerous optical interference images. Also, as only an extremely short period of several seconds has elapsed, in normal lapping and polishing no significant changes will have taken place in the contour of the surface being machined. As such, it is possible to use image processing to cut out (abstract) only the fringe images of the measurement window portions from the data for the several tens of images described above. When the interference image is reconstructed, a single large interference image can be obtained.

Figure 3:
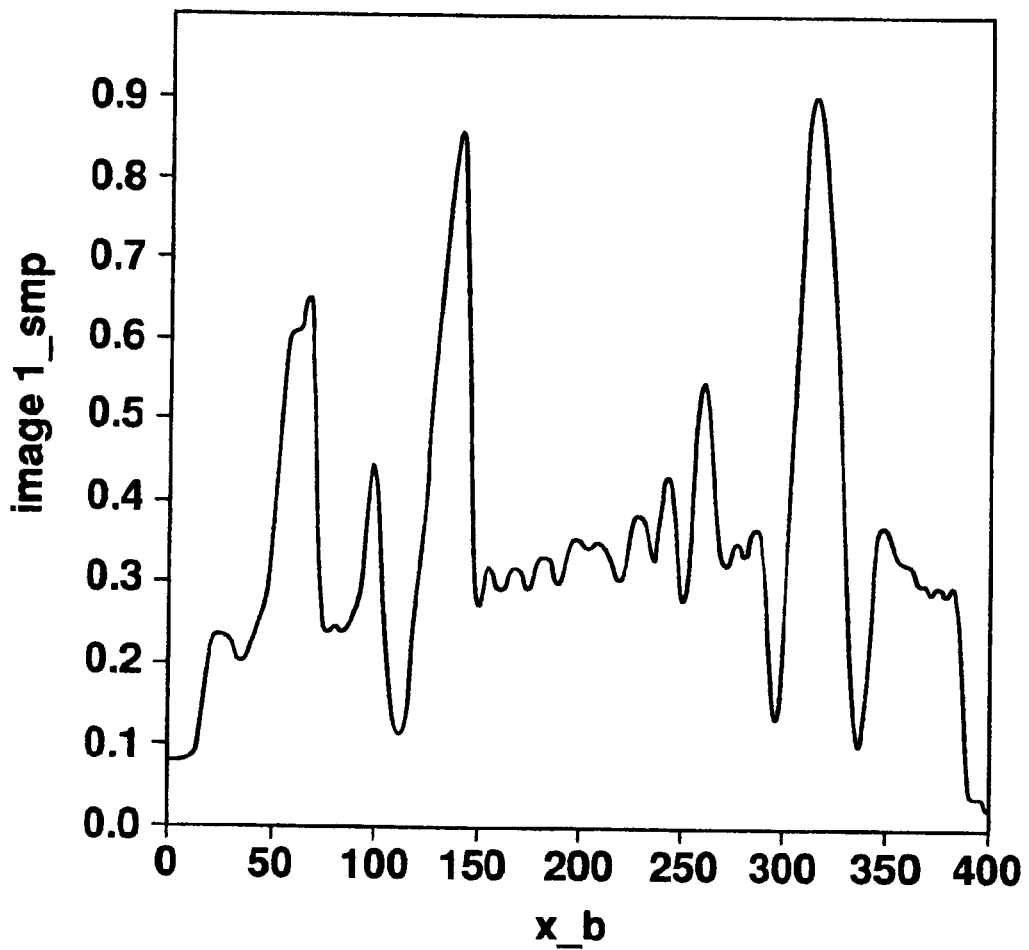
FIG. 3 is a drawing indicating the brightness intensities along the center horizontal line of the interference image of FIG. 2.

FIG. 3 shows the brightness intensities along the center horizontal line of FIG. 2. The horizontal axis represents the positions on the horizontal line as numbers of picture elements (pixels), while the vertical axis represents the brightness intensities of the various portions, using 1.0 as the maximum brightness intensity. As shown in the illustration, in the measurement window sections, the brightness intensities increase or decrease according to the brightness level of the fringe. Conversely, the tool shadow sections have a certain inherent brightness intensity, although a certain amount of inclination and distribution is present.

With that in mind, the inherent brightness intensity of the tool shadows is determined in advance as a separate process, and this is used as the reference tool shadow intensity. The brightness intensities of the various sections of the photographed images are then compared with the reference tool shadow intensity. If the brightness intensities of certain sections are the same as the reference tool shadow intensity, those sections are judged to be tool shadows. Furthermore, if the brightness intensities of certain sections are different from the reference tool shadow intensity, those sections can be judged to be measurement window sections (fringe images). Consequently, the reference tool shadow intensity can be used to eliminate tool shadows and extract fringe images.

Figure 4:
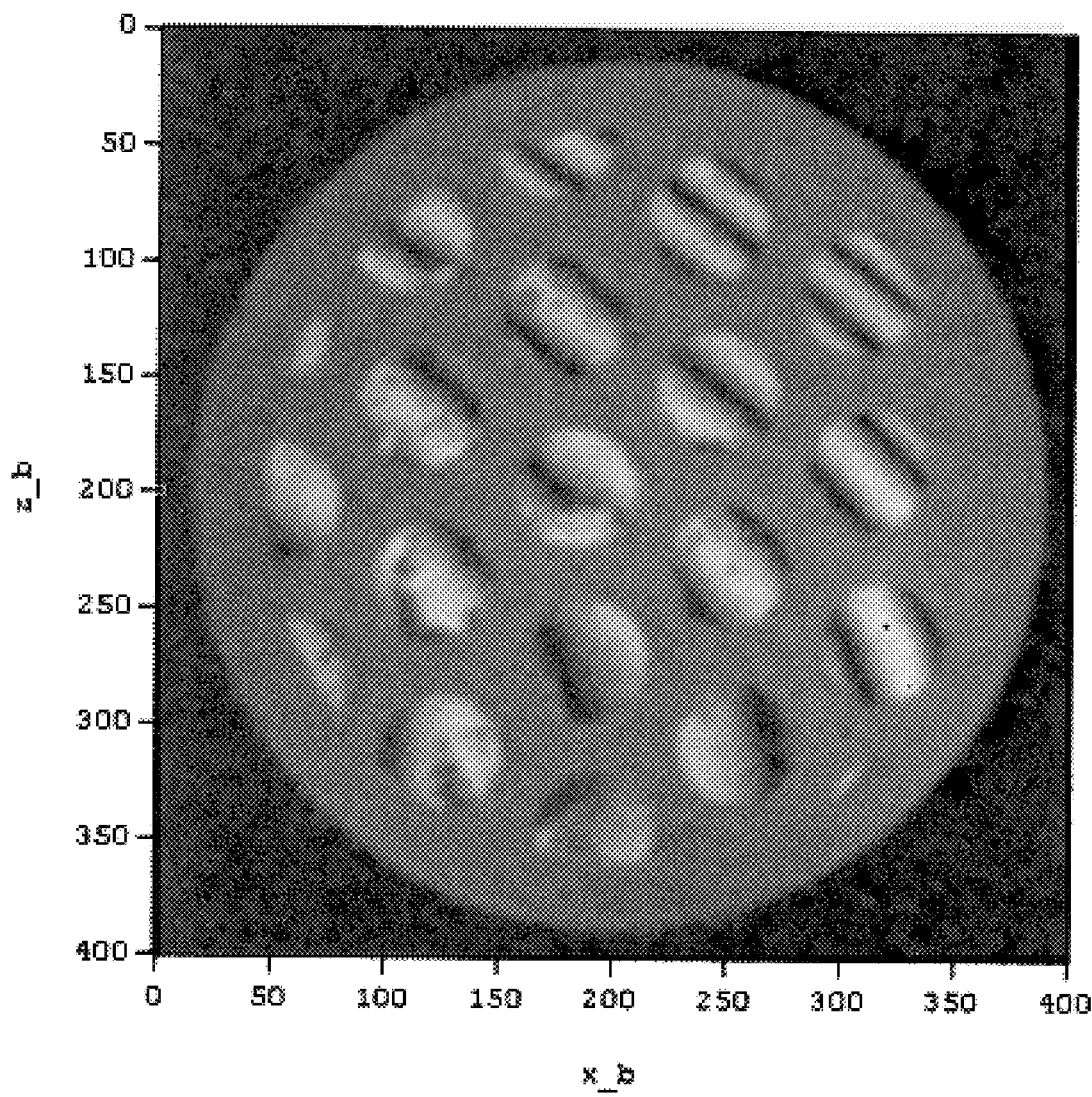
FIG. 4 is a photograph of a half-tone image showing an interference image taken with the measurement window of the lapping tool located at a different position from that of the image in FIG. 2.
Figure 5:
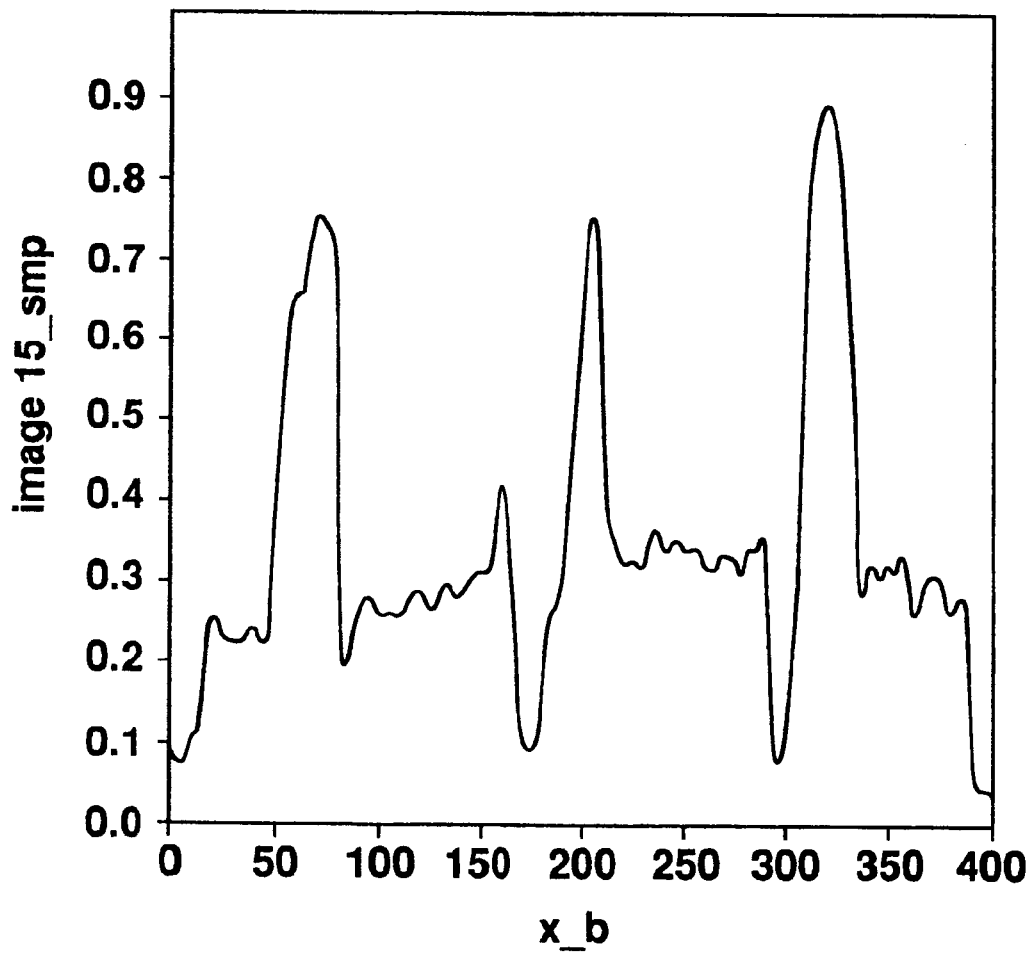
FIG. 5 is a drawing indicating the brightness intensities along the center horizontal line of the interference image of FIG. 4.

As an example of two photographed images being synthesized, FIG. 4 shows an image photographed 0.5 seconds after the image of FIG. 2 was photographed, while FIG. 5 shows the brightness intensities along the center horizontal line in the image of FIG. 4. Furthermore, FIG. 6 shows a graph of the brightness intensities of FIGS. 3 and 5 superimposed.

Figure 6:
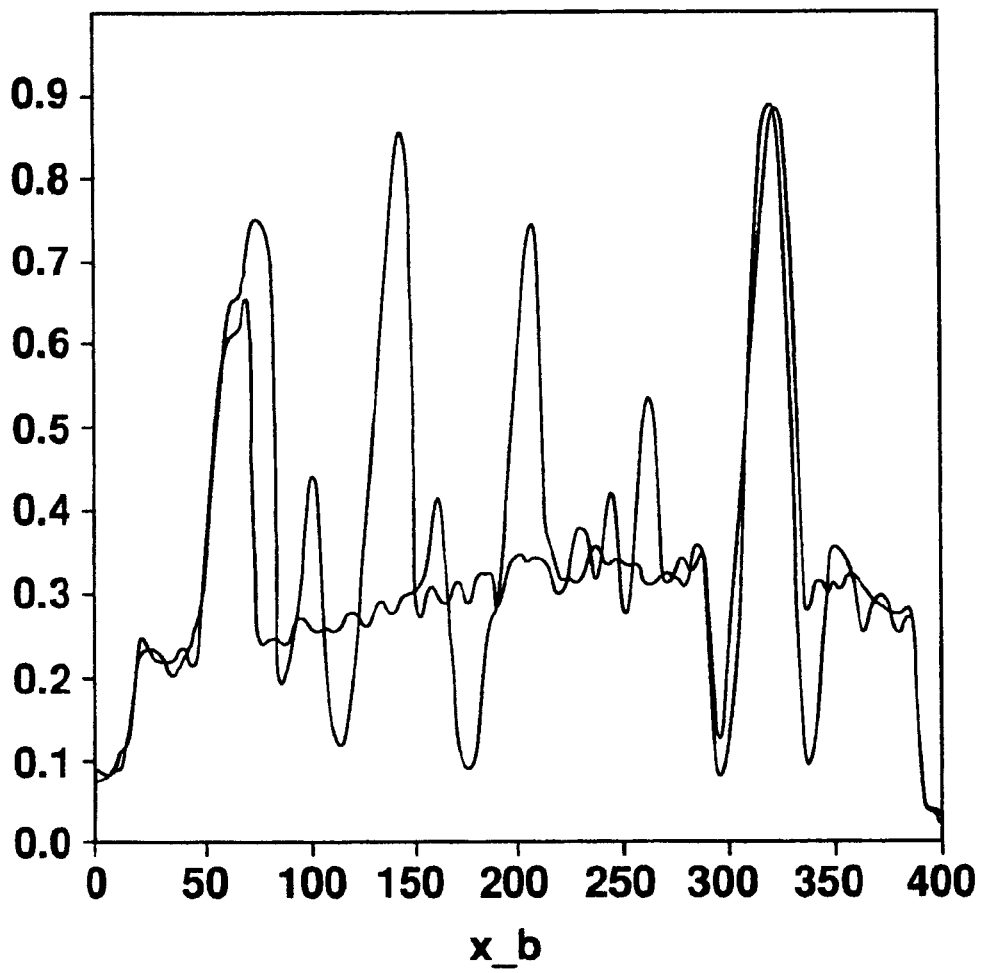
FIG. 6 is a drawing showing FIGS. 3 and 5 superimposed.

As shown in FIG. 6, the measurement windows were moved at intervals of 0.5 seconds, so that the two images show the brightness levels of the interference fringes at different positions. In certain sections, interference fringes appear in one of the images, and in other sections, interference fringes appear in the other image. In still other sections, tool shadows appear in both images.

Figure 7:
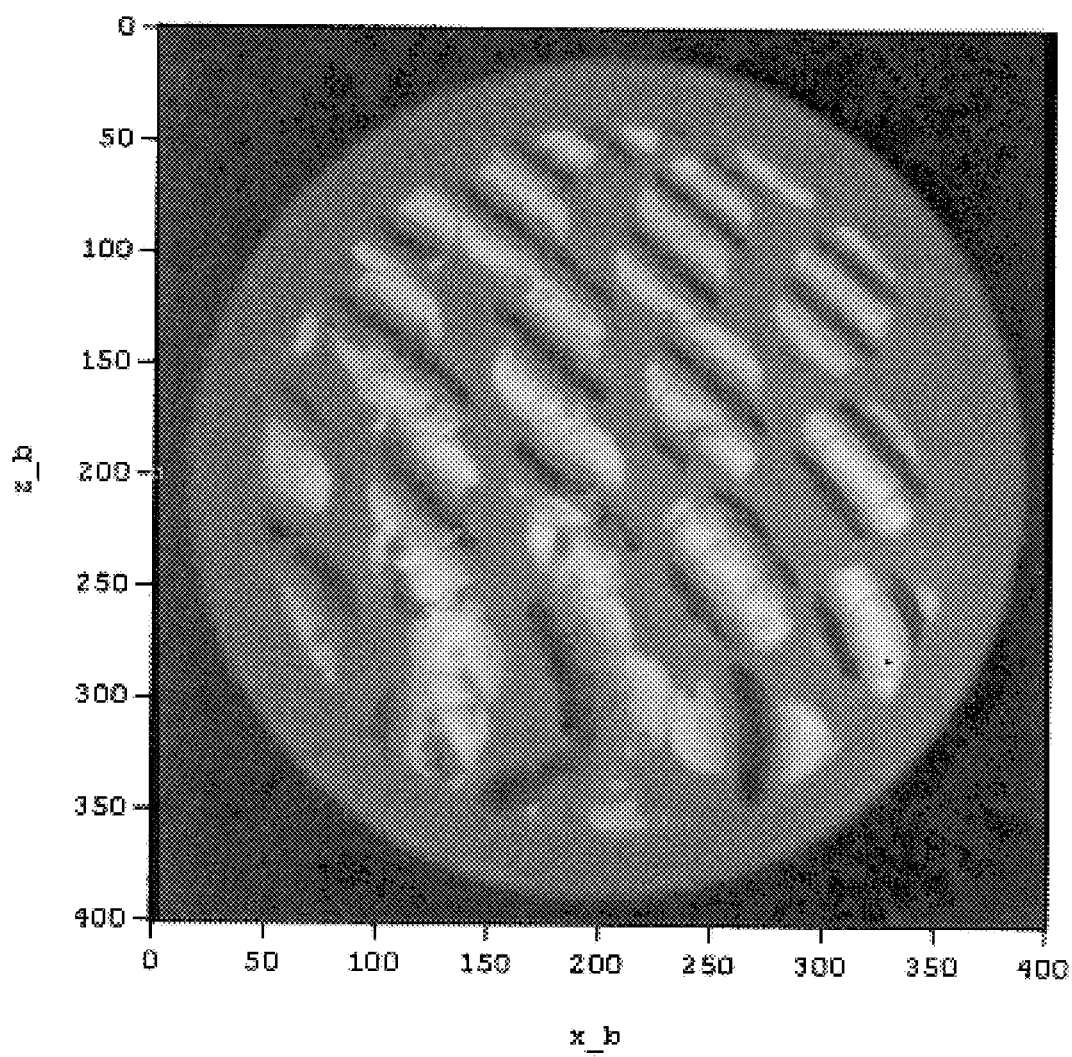
FIG. 7 is a photograph of a half-tone image showing a synthesized interference image obtained by synthesizing the images of FIGS. 2 and 4.
Figure 8:
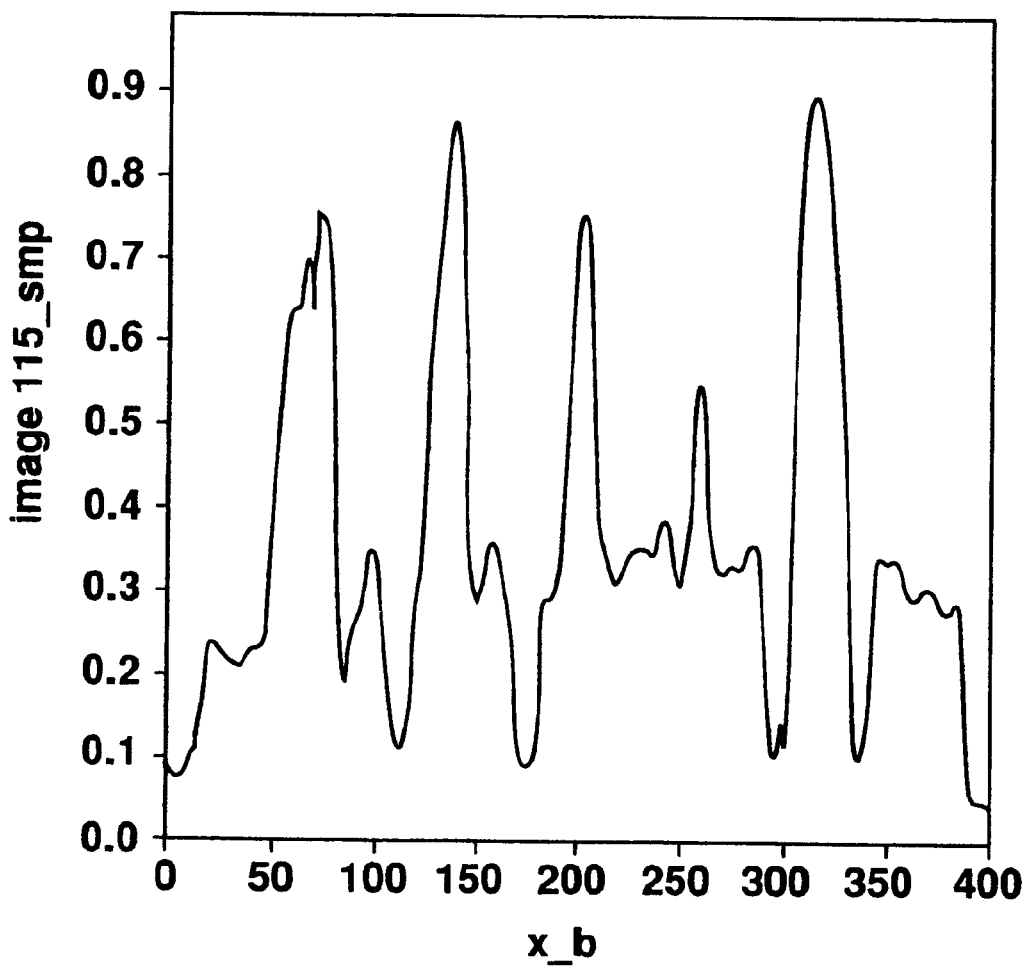
FIG. 8 is a drawing indicating the brightness intensities along the center horizontal line of the interference image of FIG. 7.

In FIG. 6, the brightness intensities of the two images at the same point on the horizontal axis are compared. One image indicates the brightness intensity of a tool shadow, while the other image has a brightness intensity indicating the brightness level of an interference fringe. Here, the brightness intensity of the former is the same as that of the reference tool shadow intensity, and the brightness intensity of the latter is different from the reference tool shadow intensity. In this case, the brightness intensity of the former is not used, and that of the latter is used. This processing is applied to FIG. 6 in its entirety, and is also applied to the optical interference images in FIGS. 2 and 4 in their entirety. FIG. 7 shows the image formed by synthesizing the two photographed images of FIGS. 2 and 4. FIG. 8 shows the brightness intensities along the center horizontal line in the image of FIG. 7. As indicated by the drawings, synthesizing the images enlarges the fringe image sections.

Although in the above example, two images were synthesized, the processing described above can also be performed on the tens of images typically obtained during a period of several seconds. By so doing, tool shadow images can be eliminated, and a synthesized image can be obtained in which the interference fringes extend over the entire area. The above is the principle behind the synthesis processing of the present embodiment.

Figure 9:
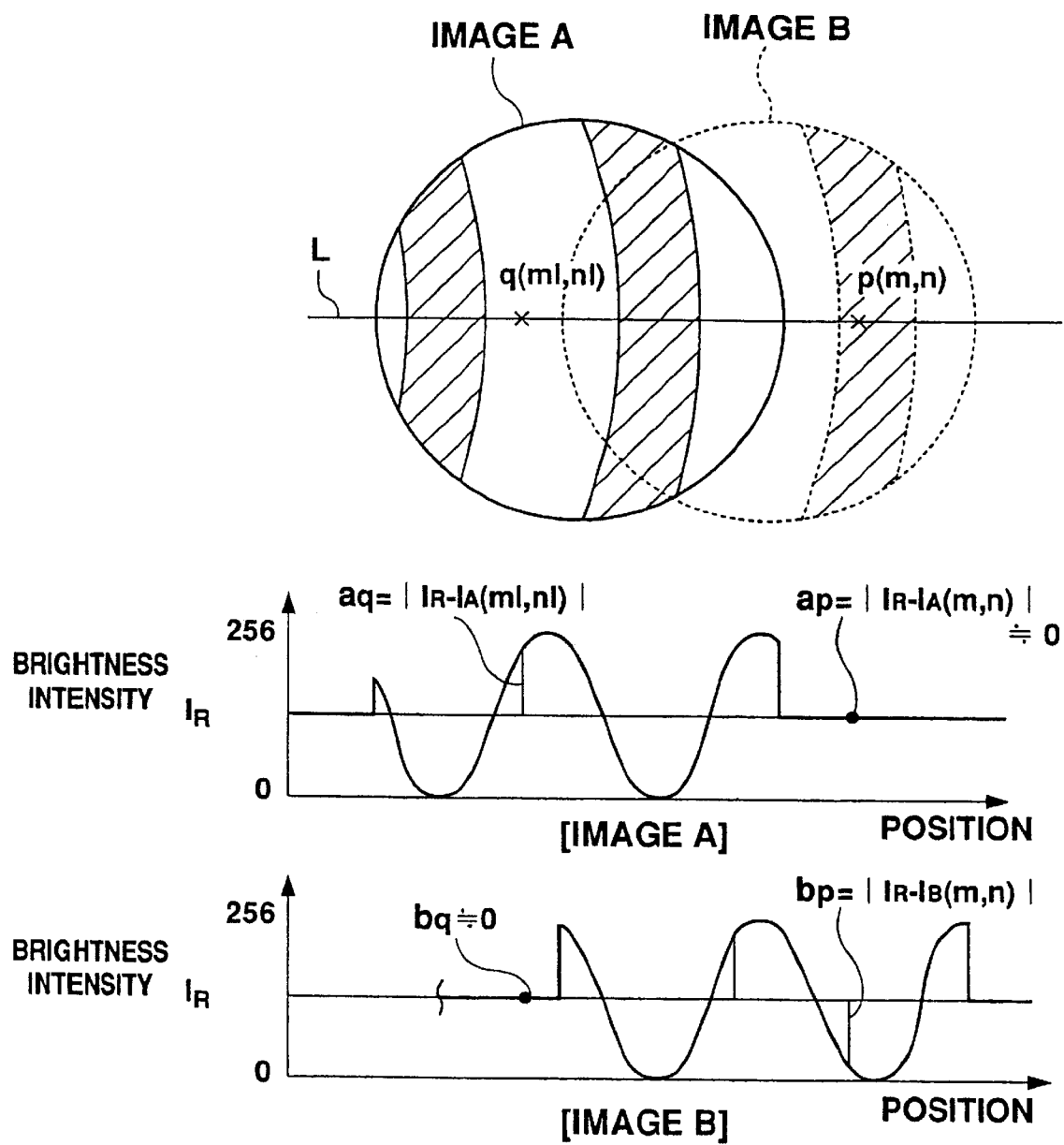
FIG. 9 is a drawing showing synthesizing processing of plural interference images.

Next, with reference to FIG. 9, the synthesis processing of the present embodiment will be described in greater detail, in accordance with the image synthesis principle described above. FIG. 9 shows an image of the interference fringe of one measurement window 9 section. Image B is an image taken after Image A was photographed and the lapping tool 5 was rotated by a small amount. With Images A and B, the positions of the lapping tool 5 were different when the two images were taken, but the position of the workpiece 11 is the same. As a result, with both images, the positions where interference fringes are possible on the workpiece 11 are the same, and furthermore, the sections of the workpiece 11 which are different can be seen from the measurement window 9.

At the bottom of FIG. 9, a model distribution of the brightness intensities along line L in the figure is seen for Images A and B. The horizontal axis represents the positions on line L, and the vertical axis represents the brightness intensities, with Images A and B being 256-gradient images. The brightness intensities are included in the data for each picture element contained in the image data.

In FIG. 9, the IR on the vertical axis is the average brightness intensity for the lapping tool section. Here, this average value IR is used as the reference tool shadow intensity. The surface of the lapping tool has been finished in such a way that any portion thereof is photographed with a generally consistent brightness intensity. Furthermore, to prevent an interference image of the lapping tool 5 from forming, the surface of the lapping tool is finished to an appropriate roughness. To obtain the appropriate size of IR, the appropriate material and finishing are used for the lapping tool, the interferometer is adjusted, and the appropriate pre-processing is carried out on the images. Because the IR value is slightly affected by the noise level and performance of the optics system, advance measurement is repeated to determine the IR value.

As shown in FIG. 9, for both Images A and B, where there is no lapping tool (measurement window sections), the brightness intensity changes cyclically in response to the brightness level of the interference fringe, and where the lapping tool is present (tool shadows), the brightness intensity is largely constant.

Here, Image A is used as a base to accomplish the synthesis of Images A and B. A picture element p which has the same position (m, n) in both images (m and n are coordinates in the image) is noted. The brightness intensities of the picture elements p (m, n) in images A and B are set to IA (m, n) and IB (m, n) respectively. The absolute values ap and bp of a difference between this IA (m, n) and IB (m, n) and the IR are calculated using the following equation.

$$ap = |IR - IA\ (m,\ n)|$$
$$bp = |IR - IB\ (m,\ n)|$$

If ap<bp, the brightness intensity of the picture element p in the data for Image A is replaced with the brightness intensity of the picture element p in the data for Image B. In other words, IA (m, n) in the data for Image A is replaced with IB (m, n). If ap≧bp, the data of the picture element p in the data for Image A is used as is, without being replaced.

When the picture element p is in the position shown in the drawing, the picture element p in Image A resides in the lapping tool portion, and ap is largely 0. In Image B, the picture element p is in the dark portion of the interference fringe. Because bp is larger than ap, IA (m, n) is replaced with IB (m, n). On the other hand, looking at a picture element q (m1, n1), in Image A the picture element q is located in the bright portion of the interference fringe. In Image B, the picture element q is in the lapping tool portion, and bq is largely 0. As a result, IA (m1, n1) remains as it is, without being replaced with IB (m1, n1).

Figure 10:
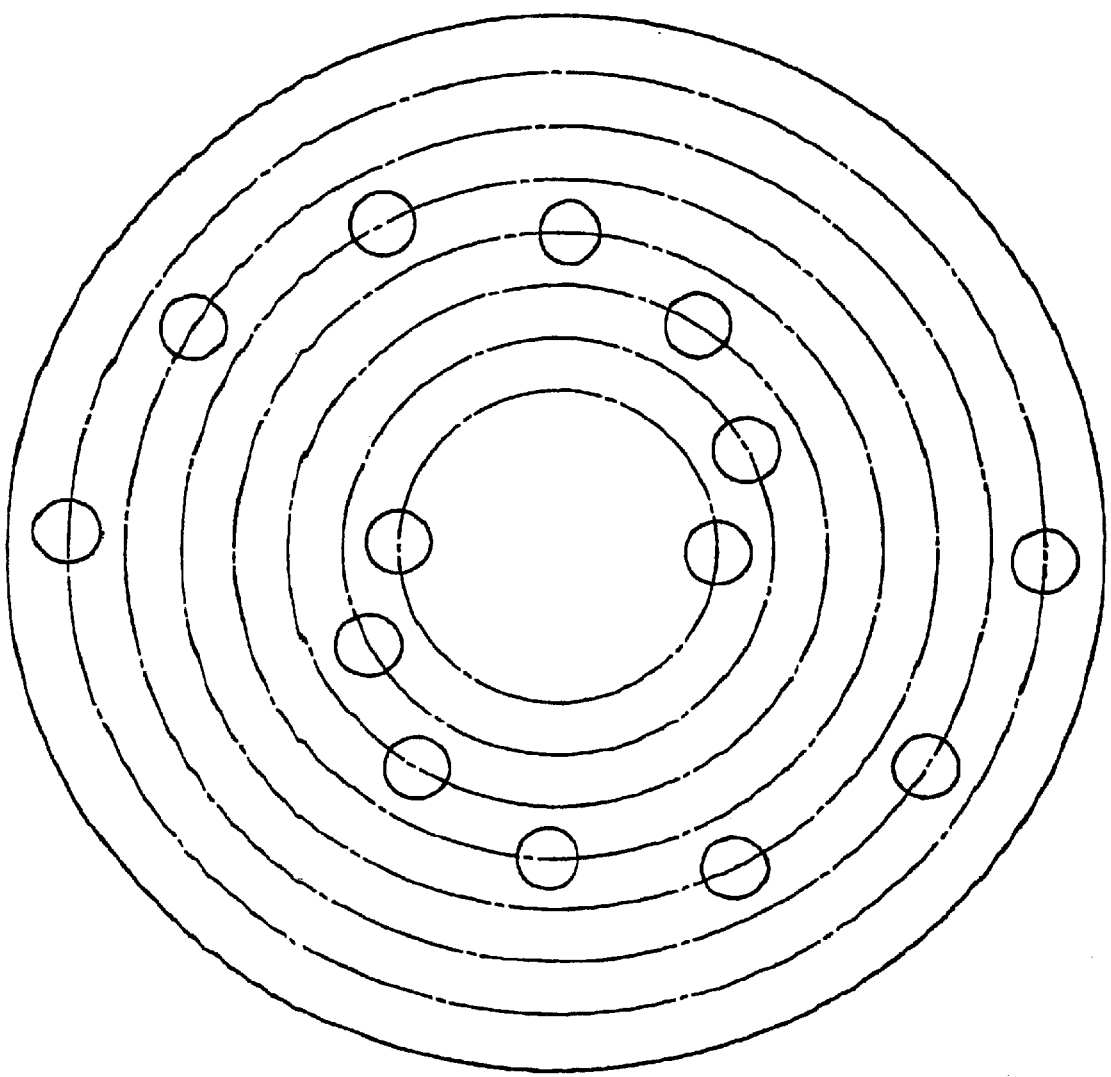
FIG. 10 is an example of the arrangement of measurement windows necessary for obtaining the interference image of the entire workpiece using the processing of FIG. 5, and shows a plan view of the lapping tool when the number of windows has been reduced.

The same processing is carried out on the overall image. In FIG. 9, there is a crescent-shaped interference fringe portion which appears only in Image B. This is added to Image A as the result of the processing described above. In addition, by using a plurality of images C, D, . . . (not shown), the same processing can be carried out for A+C and A+D, so that a broader range of interference fringes is added to Image A. In this way, interference fringes can be obtained which cover the entire workpiece 11. In principle, for example, when the measurement windows are arranged as shown in FIG. 10, the interference image for the entire workpiece can be obtained no matter what size of workpiece is placed in what position. Additionally, the brightness intensities of the various picture elements are processed here, but the processing can be carried out in the same way using other data which represents the interference fringe (for instance, the color value or luminance value).

"Improved Synthesis Processing"

In the synthesis processing described above, the average value IR of the brightness intensities for the tool shadows was used. In actuality, however, the brightness intensities of the tool shadows are not constant within the photographed image, but differ in various parts of the lapping tool, having their own distributions and inclinations. As a result, the processing of the various picture elements is not carried out based on the true brightness intensity of the tool shadow at that particular location. Under this influence, when several tens of images are synthesized, excessive contrast is produced in the interference fringes in some cases, and as a result, the synthesized image appears unnatural. More natural images can be obtained by improving the synthesis processing as described below.

Here, a standard range of values obtained for the brightness intensities of the tool shadows is set as the standard shadow intensity range. In the same way as for the average value IR, it is preferable here to measure the upper and lower limit values for the tool shadow brightness intensities in advance. The upper and lower limit values may also be set at equal widths above and below the average value IR.

The standard shadow intensity range described above is used as outlined below. With the processing of FIG. 9, as described earlier, the absolute value ap=|IR−IA (m, n)| is first determined for the difference between the brightness intensity of a picture element p in the first image, Image A, which serves as a base, and the average value IR. In the same way, bp=|IR−IB (m, n)| is determined for the picture element p of the next image, Image B, which is used for comparison purposes. In the processing of FIG. 9, if ap<bp, the brightness intensity of the picture element p in the data for Image B is substituted for the brightness intensity of the picture element p in the data for Image A. Here, however, before the data is substituted, a judgment is made as to whether or not the brightness intensity IB (m, n) of the picture element p in Image B is out of the standard shadow intensity range. If it is, ap and bp are compared, and if ap<bp, the data is substituted. If the value IB (m, n) is within the standard shadow intensity range, data substitution is interrupted and suppressed.

In this way, in the present embodiment, picture element data with a brightness intensity which is included in the standard shadow intensity range is not utilized for the constitution of the synthesized interference fringe image. Consequently, if all brightness intensities for the picture elements located in the same place in all of the images for use in the synthesis are included in the standard shadow intensity range, no picture element data substitutions are made. As a result, the data of the base image (A) which was first read will remain at the end. It is impossible to ascertain whether base image data still existing at the end in this way is a part of the true interference fringe, or whether it is a part of the tool shadow. However, even if the processing described above is carried out, it does not pose any obstacles in the processing to calculate the flatness at the final stage. Also, by executing the processing described above, it is possible to obtain appropriate images without excessive contrast.

"The Image Processing Device and Its Operation"

Figure 11:
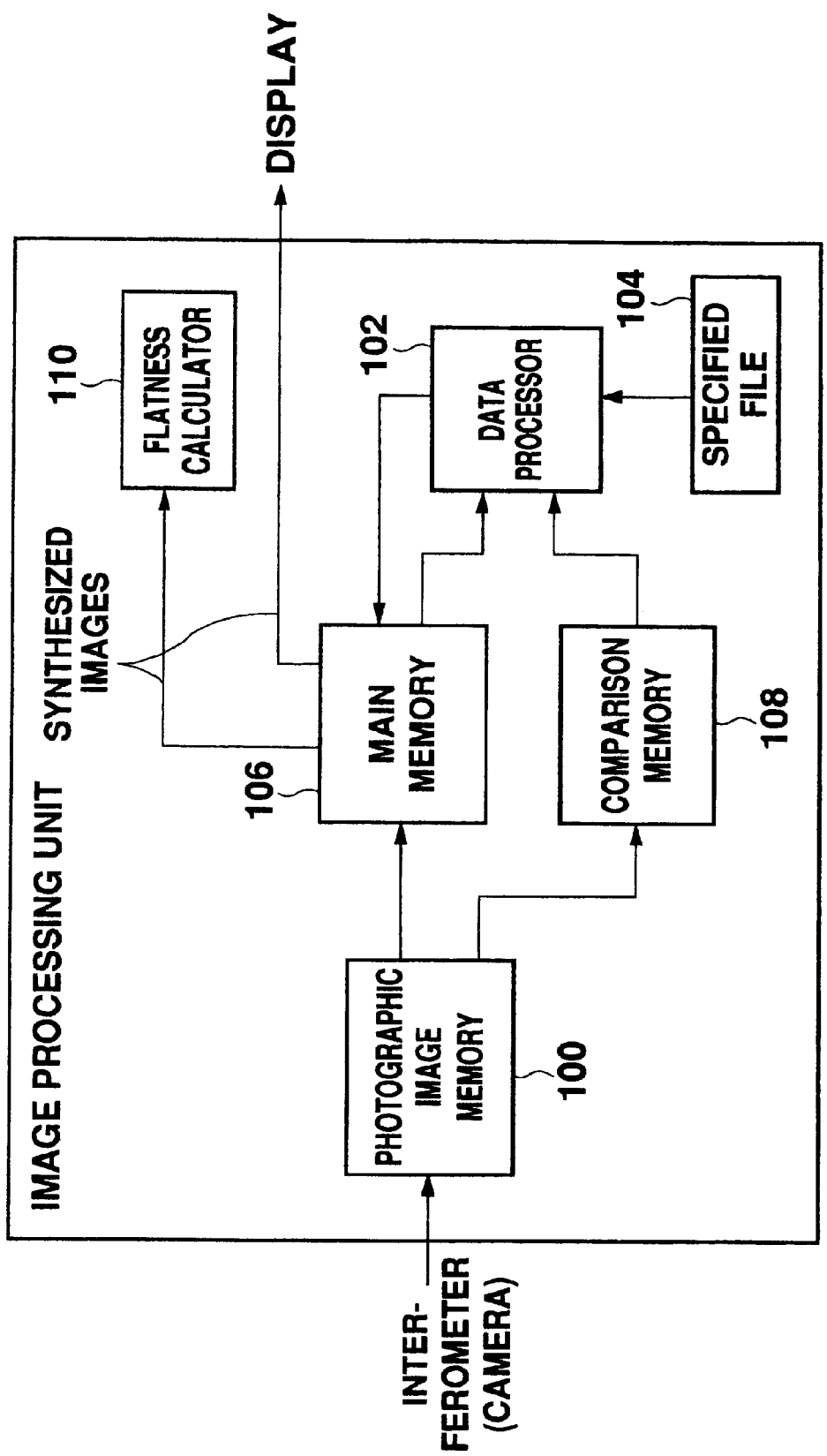
FIG. 11 is a drawing showing the constitution of the image processing device which carries out the synthesizing processing of FIG. 9.
Figure 12:
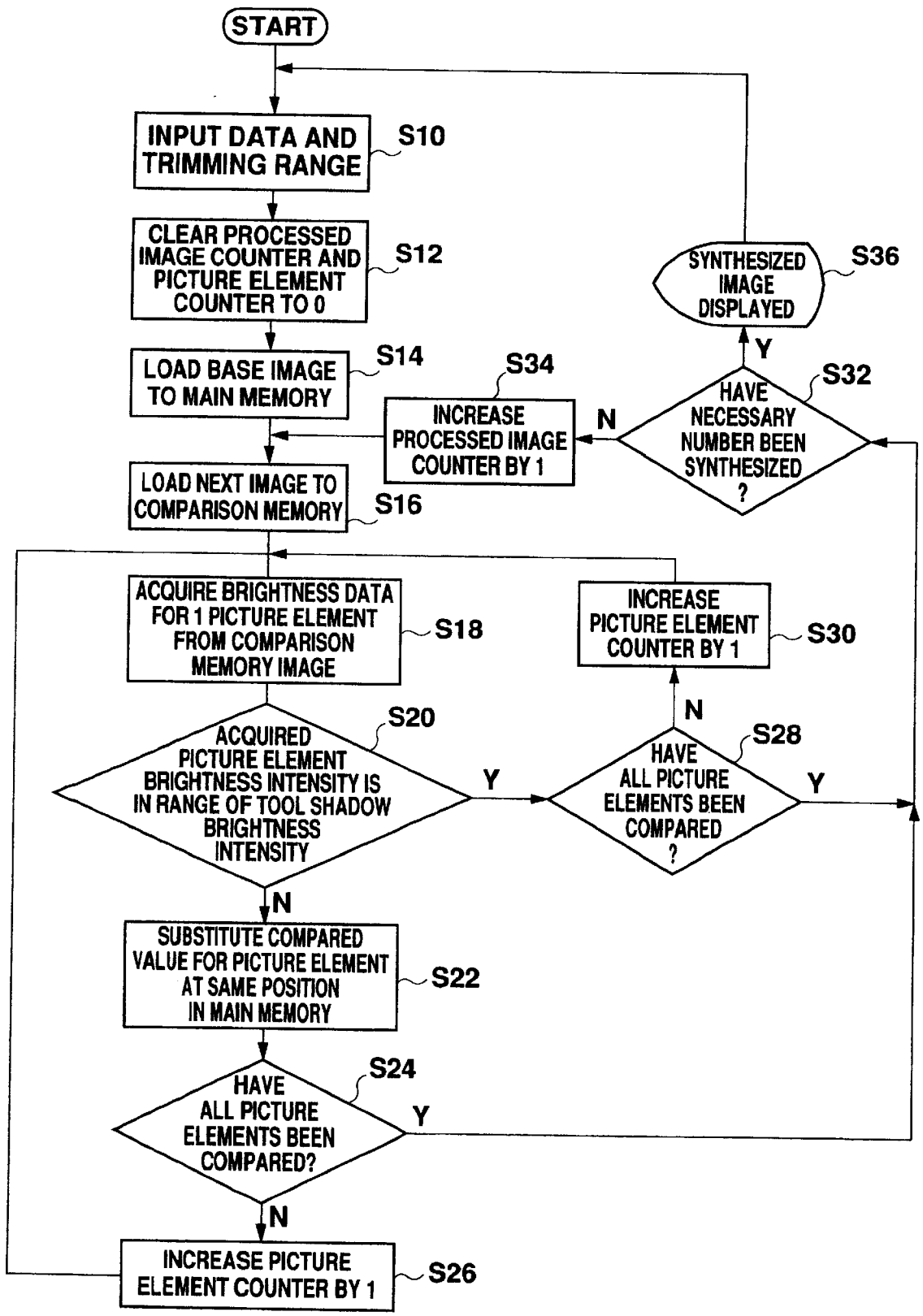
FIG. 12 is a flowchart showing the operation of the image processing device of FIG. 11.

FIG. 11 shows the constitution of the image synthesizing component which executes the synthesis processing described above, and which is a partial constitution of the image processing device provided in the controller of the machining device of this embodiment. This image synthesizing component is controlled by means of a control unit (not shown). FIG. 12 is a flowchart showing the operation of the image synthesizing component of FIG. 11.

When image synthesis begins, the image data is read from the television camera of the interferometer into the photographic image memory 100 (S10). In the present example, a photographic image memory 100 is provided in which 90 frames of image data can be stored at one time. However, the image synthesis of this embodiment can also be carried out even if a buffer is provided in which only a single-frame image can be stored. Also, in S10, a data processor 102 reads the trimming range from a set file 104. The trimming range is the range within the photographed image in which image processing is carried out. The various images are processed after trimming of this range has been done. In this example, the trimming range is set as a circle with largely the same size as the workpiece 11.

Next, in the data processor, an image processing counter which indicates the number of the image targeted for processing and a picture element counter which indicates the number of the picture element targeted for processing are cleared to 0 (S12). The first image is then loaded into the main memory 106 to serve as the base image (S14), and the second image is loaded into the comparison memory 108 to be used for comparison (S16). Both memories 106 and 108 may have sufficient capacity to store a single-frame image in each memory. The data processor 102 acquires the picture element brightness information corresponding to the picture element number of the picture element counter (S18) from the comparison memory 108. Then a judgment is made as to whether or not the acquired picture element brightness intensity is within the brightness intensity range of the tool shadow (the standard tool shadow range described earlier) (S20).

If the outcome of the judgment made at S20 is "YES", the picture element data substitution described in FIG. 9 takes place (S22). Here, the absolute value bp is determined for the difference between the brightness intensity IB acquired at S18 and the average value IR of the tool shadow brightness intensity. Also, the brightness intensity IA of the picture element data corresponding to the picture element number of the picture element counter, which is the picture element data from the main memory 106, is obtained. The absolute value ap of the difference between the obtained brightness intensity IA and the average value IR is determined. The values of ap and bp are compared, and, if bp>ap, the picture element brightness information stored in the main memory 106 is replaced with the brightness information of the same picture element acquired from the comparison memory 108.

Next, the picture element counter number is referenced, and a judgment is made as to whether or not comparison processing has been executed for all of the picture elements of the comparison image from the comparison memory 108 (S24). If the outcome of S24 is "NO", the picture element counter is increased by 1 (S26), and processing returns to S18. This initiates the same type of processing for the picture element with the next picture element number.

If the outcome of the judgment made at S20 is "NO", processing advances to S28. At S28, in the same way as at S24, a judgment is made as to whether or not comparison processing has been completed for all of the picture elements, and if the outcome is "NO", the picture element counter is increased by 1 (S30), and processing returns to S18. In this way, in the present embodiment, if the brightness intensity of the picture element in the comparison image is included in the standard shadow intensity range, no substitution of picture element data is made.

If the outcome of S24 or S28 is "YES", the processing for one frame of the comparison image is completed. At this point, at S32, the processing image counter is referenced, and a judgment is made as to whether or not synthesis processing of the required number of images has been completed. With the present embodiment, the required number of images is set at 90. Because 30 frames of images can be photographed each second, 90 images are photographed in three seconds. If the outcome of S32 is "NO", the image processing counter is increased by 1 (S34), and processing returns to S16. Consequently, the next image is loaded from the photographic image memory 100 to the comparison memory, and processing is executed again, in the same way.

Figure 13:
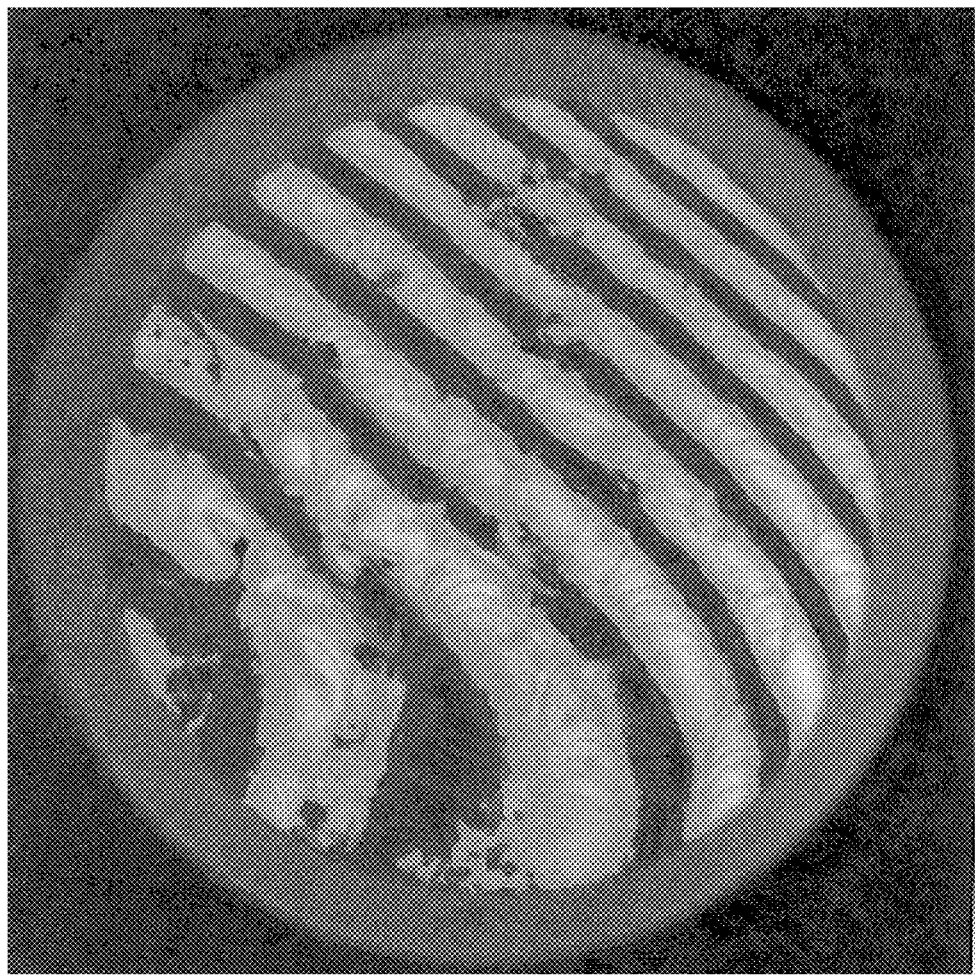
FIG. 13 is a photograph of a half-tone image showing the final synthesized image obtained through the processing of FIG. 12.

If the outcome of S32 is "YES", the image processing for all of the 90 images is completed. At this point, the synthesized image is displayed on the display (S36). Following the display of the image, processing returns to S10, and the next synthesized image is processed. FIG. 13 shows the synthesized image obtained from the 90 photographic images in the way described above. As shown in FIG. 13, consecutive interference fringe images are obtained over the entire trimming range.

Figure 14:
FIG. 14 is a photograph of a half-tone image showing a binary image of the image of FIG. 13.

The synthesized image is sent to a flatness calculator 110, where flatness calculation processing is carried out. As shown in FIG. 13, with the synthesized image obtained in the present embodiment, interference fringes continue across an amply broad range. As a result, this synthesized image can be used to calculate the flatness, using a commonly known analysis algorithm. With the flatness calculator 110, functions such as contrast enhancement, binary processing, reduction of lines, and allocation of the number of fringes can be made. FIG. 14 shows a binary image of an interference fringe. Flatness calculation using image processing of an interference fringe can be carried out using, for example, the method described in the article "Recent Advances in Optical Interference Measurement Methods" (Toyohiko Yagatai, Precision Machinery 51/4/1985, p. 65–72) mentioned earlier.

"System Constitution of the Machining Device"

Figure 15:
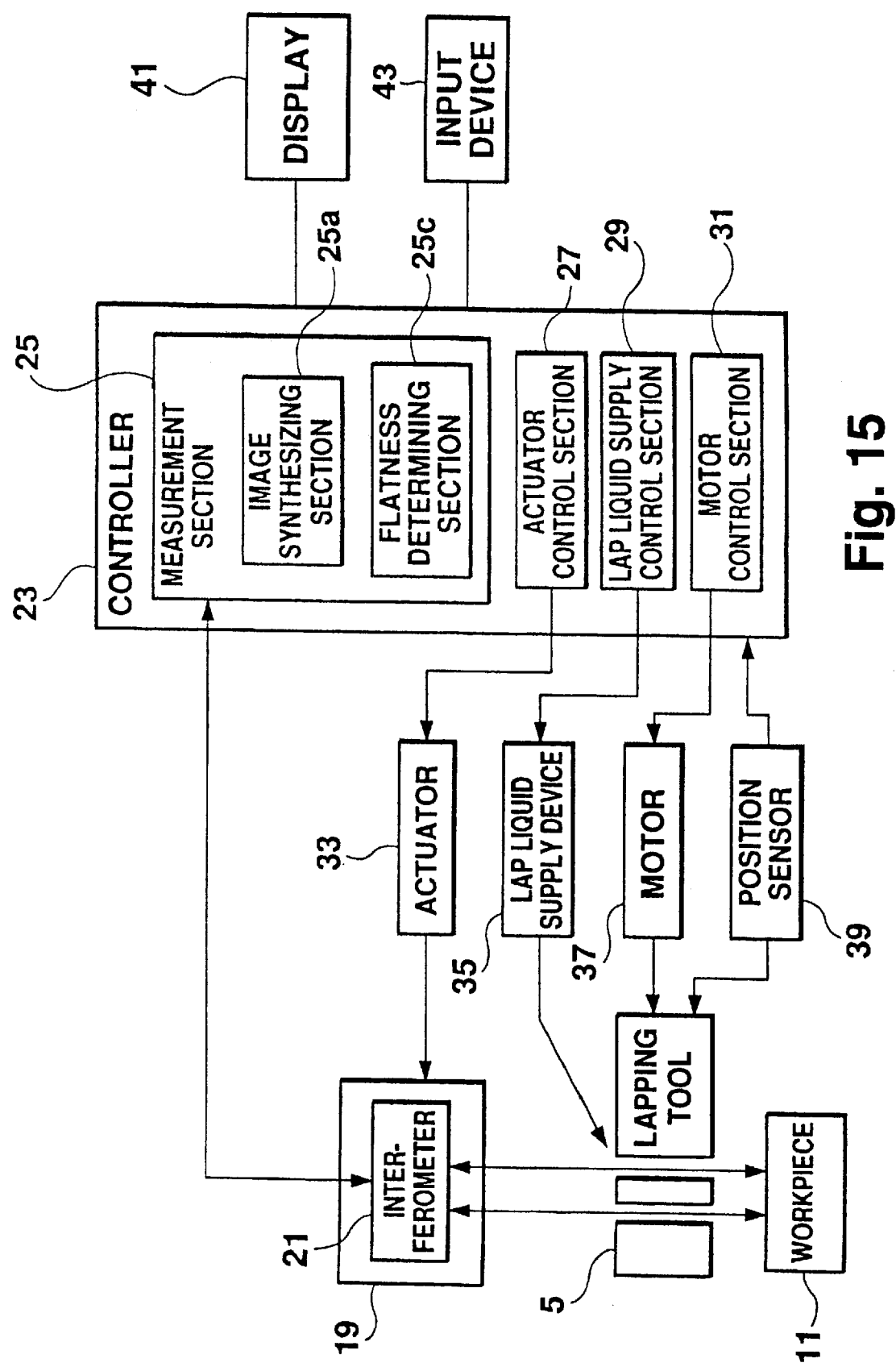
FIG. 15 is a block drawing of the overall constitution of the lapping machine of FIG. 1.

FIG. 15 shows the overall constitution of the lapping machining device of the present embodiment. As described earlier, the lapping tool 5 is positioned on the workpiece 11, and an interferometer 21 is positioned inside the interferometer main unit 19 above that. A camera device is incorporated into the interferometer 21, and the interference fringe images photographed by the camera are sent to a controller 23. The controller 23 contains a measurement unit 25, an actuator control unit 27, a lap fluid supply control unit 29, and a motor control unit 31. The measurement unit 25 includes the image processing device of FIG. 11, described earlier, and the image synthesis unit 25a executes the image synthesis processing which is a feature of the present embodiment. The flatness judgment unit 25b includes the flatness calculator 110 of FIG. 11, and in addition to executing commonly known flatness calculation processing, it also judges the calculated results.

The actuator control unit 27 controls the actuator 33. The actuator 33 rotates in relation to the support rod of the interferometer main unit 19, and expands/contracts the interferometer main unit 19. This makes it possible for the interferometer 21 to move above each of the three workpieces 11.

The lap fluid supply control unit 29 handles control of the lap fluid supply unit 35, and controls the position at which the lap fluid is supplied, the interval during which fluid is supplied, and the amount of fluid supplied. The lap fluid supply unit 35, as described earlier, allows lap fluid to drip onto the lapping tool 5. The motor control unit 31 controls the rotation, stopping, and rotation speed of the motor 37 which rotates the lapping tool 5.

The controller 23 is also connected to a position sensor 39 which detects the position of the lapping tool 5 in the height direction. The amount of travel by the lapping tool is ascertained based on the output from the position sensor 39, along with the thickness of the workpiece 11 and the amount cut away by the lapping processing.

Furthermore, a display 41 which serves as an output device and an input device 43 such as a keyboard are connected to the controller 23. The synthesized interference image formed by the image synthesis unit 25a is displayed on the display 41. The input device 43 is used by the operator to input instructions to run and stop the device, as well as other instructions. The display 41 also displays the appropriate screen displays required for operation by the operator.

In the system of FIG. 15, when machining begins, the motor control unit 31 rotates the motor 37. The lapping tool begins to rotate, and the workpiece 11 rotates both passively and autonomously in relation to the lapping tool 5. Along with this, the lap fluid supply control unit 29 supplies lap fluid to the lap fluid supply unit 35, and this lap fluid then passes through the measurement window and flows into the clearance between the lapping tool 5 and the workpiece 11. In this way, lapping machining is carried out.

The actuator control unit 27 controls the actuator 33, and moves the interferometer 21 upwards above the three workpieces in sequential order. Above each of the three workpieces 11, the interferometer 21, in response to instructions from the measurement unit 25, detects and photographs the interference fringes of the workpieces 11, and sends the images to the controller 23. The actuator 33 and the interferometer 19 repeat these operations at a predetermined period.

Here, the lap fluid supply control unit 29 supplies lap fluid every predetermined time. Until a given period of time has elapsed after lap fluid has been supplied, interference fringes are not detected. This is because, if the lap fluid is not uniform, it is difficult to judge the flatness accurately. With this processing, for example, photographic processing by the interferometer 21, or data processing by the measurement unit 25, can be inhibited.

With the measurement unit 25, the flatness of the machined surface of the workpiece 11 currently being machined is determined, based on the output from the interferometer 21. A judgment is made as to whether or not the required precision for the flatness has been reached. With the controller 23, a judgment is made as to whether or not the required value for machining of the workpiece 11 in the depth direction has been reached, from the output from the position sensor 39. If a judgment is made that the workpiece 11 has been machined to the required value in the depth direction, and the flatness has reached the required precision, the motor control unit 31 stops the motor 37, and this concludes lapping machining of the workpiece 11.

"Synthesis Processing (2)"

With the synthesis processing described above, the average value IR of the brightness intensities of the tool shadow images was used. Only one average value IR is set for the entire area of the optical interference image. In other words, normally only a single average value IR is used. In actuality, however, the various parts of the lapping tool have different brightness intensities for the tool shadow images. In order to prevent the formation of unnatural synthesized images, improved synthesis processing using standard shadow intensity ranges can be used.

With regard to this, in the second type of synthesis processing, the single average value IR and the standard shadow intensity range described above are not used. Rather, the brightness intensities at the time when tool shadows are produced are measured in advance. The brightness intensities for the various measured parts are stored as the reference tool shadow intensities, along with the measured positions (the positions in the image).

Image synthesis processing is carried out as described below. When processing of a certain picture element is carried out, the brightness intensity of that picture element is obtained from the base image and the comparison image. Also, the reference tool shadow intensity corresponding to the position of that picture element is obtained from the information stored in the memory. These data are then used to carry out the synthesis processing described earlier. There is no need for a standard shadow intensity range. Consequently, steps S20, S28, and S30 can be eliminated from the processing of FIG. 12.

Using this second synthesis processing, processing is executed based on the individual reference tool shadow intensities for the various parts of the image, enabling more precise synthesized interference images to be obtained.

As described above, the present invention enables measurement of surface contours such as flatness while machining is in progress. As a result, comprehensive machining can be done with a high degree of reliability. In addition, the measurement results are fed back to the machining conditions of the machining device, producing optimum automatic adjustment of the machining conditions. By so doing, the conditions can be corrected to accommodate disparities in the skill levels of the machine operators and changes in environmental conditions, and high-precision machining can be partially or completely automated.

In particular, using the present invention, consecutive interference fringes can be obtained over a range linking the interference fringes from the measurement window sections, as described above. Because interference fringes can be obtained across a sufficiently broad range, calculation of the surface profile based on image processing using interference fringes can be carried out more easily, on a comprehensive basis.

Embodiment 2

The description provided in a second embodiment of the present invention corresponds to Japan Patent Application H10-97174, filed on Apr. 9, 1998, to which this application claims priority under the Paris Convention.

The second embodiment of the present invention relates to a machine tool installed in a machining device, and in particular to a machine tool which enables optical measurement of a workpiece surface to be carried out while machining of the workpiece being held in the machining device is in progress. Furthermore, the present invention relates to an optical measurement device and to a machining device which use this type of machine tool.

The background of the invention relating to the second embodiment is described below.

Mirror finishing and grinding finishing to finish a workpiece surface to mirror-like conditions are commonly known, and are applied in the manufacturing of various types of products. With respect to grinding finishing in particular, an extremely high level of machining precision is required, and precision measurement is carried out in order to ascertain the degree of machining precision. Optical measurement technology is commonly used in this type of precision measurement. For example, in optical interference measurement, interference fringes may be detected using optical means. Using images of the interference fringes that appear on the surface contour of the workpiece, the surface profile (ruggedness, roughness, contour, etc.) is measured. Commonly-known examples of such measurement devices include the Fizeau interferometer and the Michaelson interferometer.

In ordinary grinding finishing, a large volume of working fluid (such as water) is continuously supplied to the workpiece being machined. However, when such large volumes of working fluid are present, measurement of the workpiece surface using optical means becomes difficult. Moreover, while machining is in progress, the machine tool is located close to the workpiece, and interferes with optical measurement. Consequently, conventionally it has not been possible to carry out precision on-the-fly measurement using optical measurement.

Therefore, conventionally, where machining is performed with the workpiece set in place on the machining device (machine tool), the workpiece is removed from the machining device and cleaned before being set on the measurement device, at which point measurement is carried out. After the measurement has been completed, the workpiece is removed from the measurement device and set back on the machining device, and machining is resumed. In this way, the machining process and measurement process are repeatedly alternated, until, ultimately, the desired degree of machining accuracy is obtained, at which point machining is terminated.

With the machining method described above, however, the workpiece is removed from the machining device and set on the measurement device, and the procedure is then reversed, and these operations must be repeated. This involves considerable delay and adds to the machining time and machining cost. In addition, because separate devices are used for machining and measurement, it is difficult to precisely judge whether or not the machining conditions are satisfactory, or to precisely judge the machining accuracy. Furthermore, when the workpiece is held in the machining device using a clamp or similar means, there are instances in which the pressure of the clamp distorts the workpiece, and this distortion then causing machining defects. Conventionally, it has been difficult to detect clamping distortion with the workpiece set in place, and dedicated measuring instruments were required, pushing costs higher and making it problematic to prevent machining defects in advance.

The above problems are inherent in conventional grinding technology and also apply in other forms of machining. Additionally, these problems affect types of optical measurement other than optical interference measurement.

An objective of the present invention is to enable on-the-fly optical measurement of the workpiece surface by improving the machining tool installed in the machining device.

Another objective of the present invention is to provide the optimum optical measurement device and machining device using this type of machine tool.

In order to achieve the above objectives, the second embodiment of the present invention is configured as a machining tool installed in a machining device and used for machining a workpiece held in the machining device, with working fluid being supplied to the workpiece; and includes a tool unit that comes in contact with and machines the workpiece; a tool base unit that holds the tool unit and installs it in the machining device; an optical path which penetrates the tool base unit and along which measurement light is conducted for the purpose of optically measuring the workpiece surface; and a compressed air path which is provided inside the tool base unit and which conducts compressed air and discharges it through a clearance between the tool base unit and the workpiece; and which enables on-the-fly optical measurement using a flow of gas or vapor which passes along the compressed air path and is discharged, to eliminate working fluid near the exit of the optical path.

According to the present invention, compressed gas or vapor is conducted through an optical path and is discharged into the clearance between the tool base unit and the workpiece, flowing through this clearance at high speed. This gas flow eliminates working fluid located between the tool base unit and the workpiece, at which time working fluid at the exit port of the optical path is also eliminated by the high-speed gas flow moving in a constant direction. Because the working fluid is eliminated at the exit port of the optical path, measurement light conducted along the optical path is able to irradiate the surface of the workpiece. As a result, on-the-fly optical measurement of the workpiece surface is enabled.

In another aspect, a machine tool device of the present invention, the tool base unit is separated from the workpiece by a predetermined distance and has a surface opposite to and facing the workpiece; a discharge port of the compressed gas or vapor path is provided in the surface facing the workpiece; the tool unit has a tool ring which is provided in such a way as to encompass the discharge port, and which protrudes from the surface facing the workpiece, in the direction of the workpiece, and comes in contact with the workpiece surface; a tool flute or flutes (grooves) are provided inside the tool ring, so that the workpiece surface is exposed and gas or vapor discharged from the discharge port escapes to the outer side of the tool ring; the exit of the optical path is located in the tool flute; gas or vapor passing the tool flute is discharged along the compressed gas path to eliminate working fluid in the exit port of the optical path.

With the constitution as described above, the discharge port of the compressed gas is encompassed by a tool ring. The compressed gas is discharged into a space bordered by the surface of the tool base unit facing the workpiece, the workpiece surface, and the tool ring. Then, the discharged gas forms a high-speed gas flow which flows in a constant direction through the tool flute provided in the tool ring, and escapes to the outer side of the tool ring. Working fluid in the vicinity of the optical path exit provided in the tool flute is dispersed by the high-speed gas flow, and is eliminated. Because the working fluid is eliminated, measurement light passing along the optical path irradiates the workpiece surface exposed in the tool flute.

In this way, according to the present invention, working fluid at the optical path exit port can be thoroughly eliminated using a simple configuration in which the tool ring, the gas discharge port and the optical path exit are arranged as described above, and on-the-fly optical measurement is enabled.

In the present invention, the shape of the tool ring may, for example, be circular (doughnut-shaped). However, the shape of the tool ring in the present invention may be of any desired shape that encompasses the discharge port, and is not limited to the circular shape described above. Another acceptable shape is, for example, a polygon with an open center.

It may be preferable for the tool ring described above to include plural segmented grinding stones positioned so that they encompass the discharge port of the compressed gas path, and which are installed on the surface of the tool base facing the workpiece. Then, the tool flute is constituted in such a way that there are clearances between adjacent segmented grinding stones and the exit of the optical path is provided on the surface facing the workpiece and between adjacent segmented grinding stones.

In this aspect, the sections between adjacent segmented grinding stones correspond to the tool flutes. An escape path for the gas is formed by the surface facing the workpiece, the adjacent grinding stones, and the workpiece surface. The discharged gas flows towards the surrounding segmented grinding stones, and flows into the escape path described above. At this point, working fluid in the vicinity of the optical path exit port provided between the grinding stones is scattered and dispersed. According to this aspect, plural grinding stones are arranged so that they may be separated from each other, whereby the tool ring is formed, and at the same time, the tool flute is formed. As a result, the machine tool of the present invention can be easily manufactured.

It may also be preferable for the machine tool of the present invention to have a working fluid supply path which conducts working fluid to the contact surfaces of the tool ring and the workpiece, and which is arranged in such a way that it passes through the tool base unit and the tool ring.

According to this aspect, working fluid is supplied directly from inside the tool to the contact surfaces of the tool and the workpiece. Working fluid which is exuded from these contact surfaces is dispersed by the gas flow as described above. As a result, working fluid can be thoroughly eliminated from the measurement area while an ample amount of working fluid is still being supplied to the areas of the workpiece being machined.

In another aspect, the present invention may be a machine tool installed in a machining device used for machining a workpiece held in the machining device, with working fluid being supplied to the workpiece; include a tool base which is installed in the machining device and which is separated from the workpiece by a specified distance and has a surface facing the workpiece located opposite it; a ring-shaped tool ring which protrudes from the surface of the tool base facing the workpiece, in the direction of the workpiece, and comes in contact with the workpiece surface, and which is used for machining of the workpiece surface; a compressed gas path which is provided inside the tool base, and which conducts compressed gas and discharges it inside the tool ring, into a clearance between the surface facing the workpiece and the workpiece surface; a tool flute or flutes provided in at least one part of the tool ring, such that the workpiece surface is exposed, and gas discharged from the discharge port escapes to the outer side of the tool ring through the tool flute or flutes; and an optical path which penetrates the tool base unit, has its exit port at the tool flutte or flutes, and through which measurement light is conducted for the purpose of optically measuring the workpiece surface. This aspect enables on-the-fly optical measurement using a gas flow which passes along the compressed gas flow path and is discharged, and which eliminates working fluid near the exit of the optical path as it passes by the tool flutes.

Another aspect of the present invention is an optical measurement device that carries out on-the-fly optical measurement of the workpiece using the machine tool described above, this optical measurement device being installed in a machining device in which the machine tool described above is installed, and having means for conducting light into the optical path described above, in the direction in which the optical path travels.

Consequently, measurement light generated by the optical measurement device passes along the optical path and irradiates the surface of the workpiece. Optical measurement of the workpiece surface is performed using this optical irradiation.

Yet another aspect of the present invention is a machining device for machining a workpiece using the machine tool described above. The machining device includes workpiece holding means for holding the workpiece; a tool installation unit for installing the machine tool; working fluid supply means for supplying working fluid to the workpiece; compressed gas supply means for supplying compressed gas to a compressed gas path provided in the machine tool; and optical measurement means for carrying out optical measurement of the workpiece surface by irradiating the workpiece with measurement light that has passed along the optical path.

According to this aspect, the present invention is realized in the form of a machining device which includes the machine tool described above. Machining of the workpiece is carried out using the machine tool installed in the tool installation unit. Working fluid is supplied to the workpiece by machining fluid supply means. Additionally, compressed gas is supplied to the machine tool by compressed gas supply means, and in this way, working fluid is eliminated, the result being that on-the-fly optical measurement is enabled.

It may also be preferable for the machining device of the present invention to include machining control means for automatically adjusting machining conditions for machining using the machine tool described above, by feeding back the measurement results through optical measurement means.

According to this aspect, the measurement results are reflected in the machining conditions, making it possible to prevent defective machining in advance and thus to improve the machining accuracy.

As described above, according to the present invention, compressed gas is discharged between the workpiece surface and the tool base of the machine tool, enabling satisfactory optical measurement along the optical path while machining is in progress. As a result, it is no longer necessary to remove the workpiece being machined from the machining device and set it in place on the measurement device, and both the machining time and the machining cost are reduced. Furthermore, because on-the-fly measurement is possible, judgment as to whether or not the machining conditions are satisfactory, and judgment concerning the machining accuracy, can be made more easily. Additionally, it becomes possible to feed back measurement results to the machining conditions, thus preventing machining defects and improving machining accuracy. Use of this machining device also enables detection of clamping distortion which is caused by excessive clamping pressure, and machining defects at this point can also be prevented.

With references to FIGS. 16 to 19, the second embodiment of the present invention is described in detail.

FIG. 16 shows the grinding finishing device of the present embodiment, with a machine tool according to the present invention installed in the grinding finishing device.

An XY table 4 is positioned on the device base 2. The XY table 4 is designed in such a way that travel is possible in the horizontal direction by means of an actuator mechanism (not shown) (in the present embodiment, the X and Y axes are set in the horizontal direction in mutually orthogonal positions, while the Z axis is set in the vertical direction). The workpiece 100 is secured to the XY table 4 by means of a clamping device (not shown).

Additionally, a Z axis head 6 is secured to the XY table 4, on the device base 2. The Z axis head 6 is supported by a Z axis spindle 8. The Z axis head 6 has a built-in motor and actuator mechanism and rotates the Z axis spindle, as well as traveling in the Z axis direction. When machining is done, the Z axis spindle 8 is fed in the downward direction while rotating.

A machine tool 10 is installed in the tip of the Z axis spindle 8. The machine tool 10 has a tool base 12 and plural segmented grinding stones 14. The segmented grinding stones are attached to the tool base 12, which in turn is attached to the Z axis spindle 8. When machining is done, the Z axis spindle 8 moves in the downward direction while rotating, and the segmented grinding stones 14 are brought in contact with the workpiece 100, so that machining is carried out.

Additionally, a coolant supply device 16 is attached to the device base 2. Coolant is stored in the tank of the coolant supply device 16. The coolant is a type of working fluid, and is used for lubrication and cooling of the surface being machined, and to wash away chips produced during machining. Inside the machining device, a coolant supply pipe (not shown) is provided for the purpose of conducting coolant from the coolant supply device 16 to the machine tool 10. The coolant is supplied to the workpiece 100 through this coolant supply pipe and the machine tool 10.

In addition, an optical interference measurement device (hereafter referred to as "measurement device") 18 is attached to the device base 2. The measurement device 18 may, for example, be a common Fizeau device. The measurement device 18 irradiates a parallel beam (optical axis 22) in the downward direction. This parallel beam is reflected by two mirrors 20 and arrives at the machine tool 10. As described later, the optical beam passes through the optical path provided by the machine tool 10 and reaches the workpiece 100. The optical beam is then reflected from the surface of the workpiece 100 and is reflected back to the measurement device 18 by the mirrors 20. The reflected light is used to generate an interference fringe image in the measurement device 18. The interference fringe image is photographed by a camera incorporated in the measurement device 18. This interference fringe image is then used to detect the surface profile, including aspects such as ruggedness, roughness, and contour.

Additionally, a compressed air generator 24 is attached to the device base 2. The compressed air generated by this compressed air generator 24 passes through an air supply tube (not shown) in the device, and then through the machine tool 10, and is discharged in the clearance between the machine tool 10 and the workpiece 100.

Figure 17A:
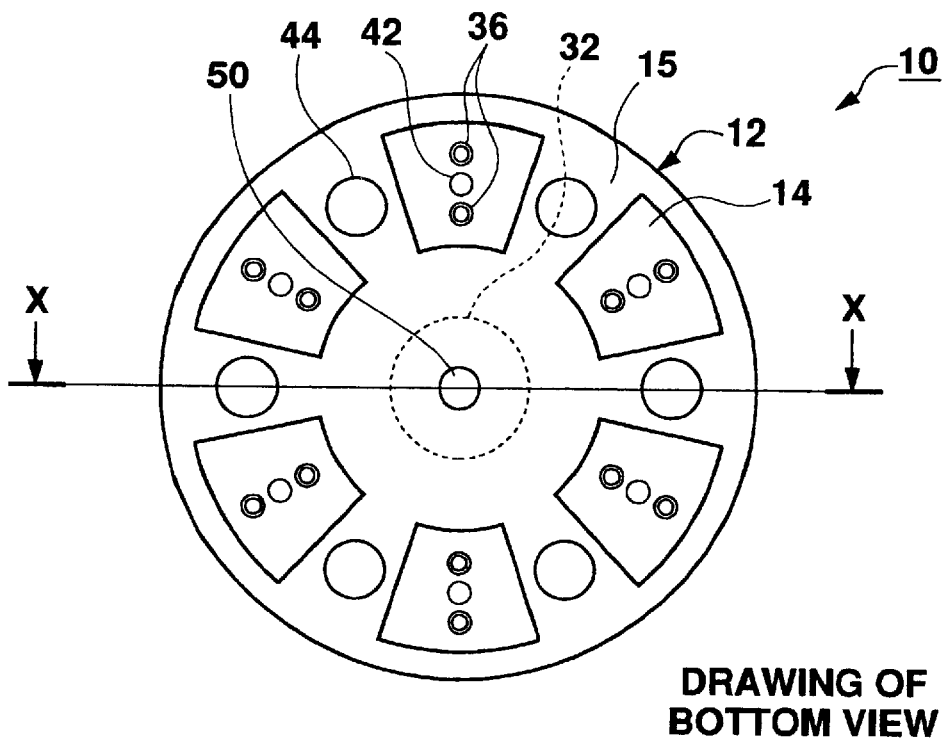
FIGS. 17A and 17B are drawings showing the machine tool installed in the machining device of FIG. 16.
Figure 17B:
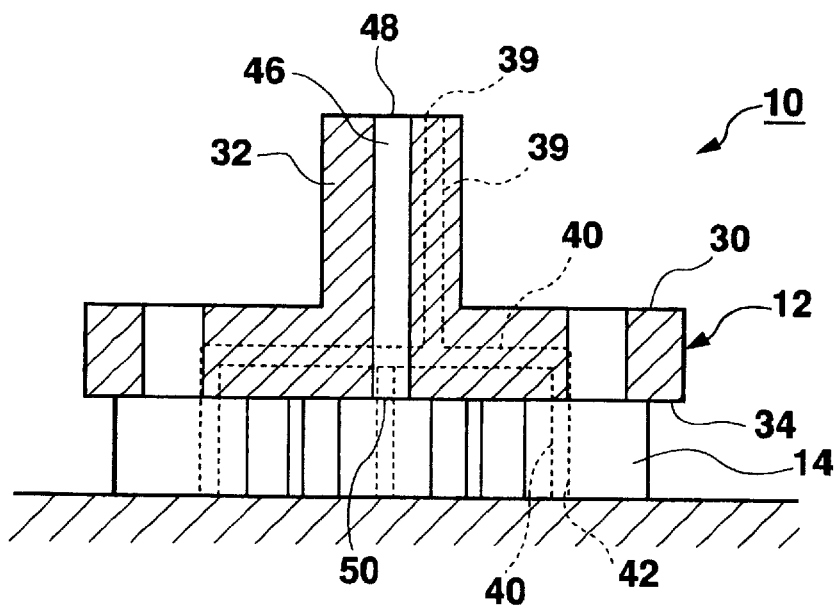
Figure 18:
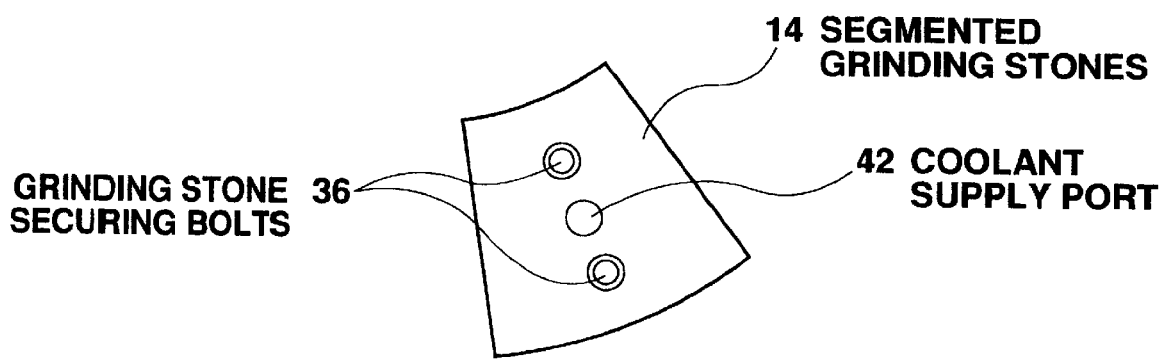
FIG. 18 is a drawing showing an enlarged view of the segmented grinding stone of FIG. 17.

Next, with reference to FIGS. 17A and B, the constitution of the machine tool 10 is described. FIG. 17A is a view of the bottom surface of the machine tool 10, and FIG. 17B is a sectional view of FIG. 17A showing a cutaway view of line X—X. The tool base 12 is disc-shaped. The tool base 12 has a shank 32 provided such that it protrudes from the center of the upper surface (shank surface) 30. The shank 32 is enclosed by the Z axis spindle 8, so that the machine tool 10 is held in place by the Z axis spindle 8.

The bottom surface of the tool base 12 is horizontal, and is parallel to the top surface of the workpiece 100. Surface 34 is the underside of the base facing the workpiece. There are six segmented grinding stones 14 positioned in such a way that they protrude downwards from the surface 34 facing the workpiece, towards the workpiece 100. Each of the segmented grinding stones 14 is a post-shaped component having a fan-shaped cross-section, and is secured to the tool base 12 by means of two bolts 36 (see FIG. 18). The six segmented grinding stones 14 are, as shown in FIGS. 17A and B, arranged in a circular constitution along the outer periphery of the tool base 12, and are positioned with a clearance between one segmented grinding stone 14 and the adjacent one. In other words, the doughnut-shaped grinding stones which have been excised at six locations are the six segmented grinding stones 14.

In this way, the tool ring of the present invention which protrudes from the surface 34 facing the workpiece is comprised of these six segmented grinding stones 14. Additionally, the sections between the six segmented grinding stones 14 correspond to the tool flutes (grooves) 15 of the present invention, and the workpiece surface is exposed at these sections.

As shown in FIG. 17B, a coolant supply path 38 is provided inside the machine tool 10. The inlet 39 to the coolant supply path 38 is on the top surface of the shank 32. The supply path 38 passes through the interior of the shank 32 and arrives at the tool base 12. In addition, the supply path 38 is divided into six branching supply paths 40 in the tool base 12, which proceed in the horizontal direction. The six divided branching supply paths 40 bend in the downward direction, and each enters a separate segmented grinding stone 14. Each of the segmented grinding stones 14 is equipped with a branching supply path, with branching supply path 40 passing vertically through the segmented grinding stone 14. The exits of the branching supply paths 40, in other words, the coolant supply exits 42, are, as shown in FIG. 17A, positioned in the centers of each of the segmented grinding stones 14.

As described above, the entrance 39 to the coolant supply path 38 is located on the top surface of the shank 32. When the shank 32 is attached to the Z axis spindle 8, this inlet 39 is joined to the coolant supply pipe in the Z axis spindle 8. As described earlier, the coolant supply pipe is connected to the coolant supply device 16 through the Z axis spindle 8 and the Z axis head 6.

Also, as shown in FIG. 17A, optical path holes 44 are provided between the adjacent segmented grinding stones 14. The optical path holes 44 are round through holes which pass through the tool base 12. One optical path hole 44 is provided in each of the clearances between the six grinding stones. Additionally, these six optical path holes 44 are provided at equal distances from the rotation center of the tool base 12.

As described earlier with reference to FIG. 16, the measurement light generated by the optical interference measurement device 18 is conducted to the tool base 12 by means of mirrors 20. At this time, the measurement light advances directly downward at a position separated from the rotation center of the base by the same distance as the optical path holes 44 described above, and arrives at the tool base 12. An optical axis such as this one is actualized by the appropriate positioning of the mirrors 20.

By providing optical path holes 38 as described above, it is possible for the measurement light to penetrate the tool base 12 and irradiate the workpiece 100. These optical path holes 38 need not be round, and may, for example, be slits. Furthermore, the optical path holes 38 may be filled with glass or another material capable of transmitting light. In other words, the optical path of the present invention includes any path which is capable of conducting the measurement light through the tool base 12.

Additionally, as shown in FIGS. 17A and B, there is a compressed air path 46 in the center of the tool base 12. The compressed air path 46 serves as the rotation center of the tool base 12, and penetrates the tool base 12 and the shank 32 vertically. The entrance 48 to the air supply path 46 is located on the top surface of the shank 32, and the exit (compressed air supply exit) 50 is the surface 34 facing the workpiece. When the shank 32 is attached to the Z axis spindle 8, this inlet 48 on the top surface of the shank is joined to the air supply pipe in the Z axis spindle 8. As described earlier, the air supply pipe is connected to the compressed air supply generator 24 through the Z axis spindle 8 and the Z axis head 6.

Optical measurement (on-the-fly measurement) may be carried out using a machine tool 10 with the above configuration as described in the below example. During machining, the machine tool 10 is pressed against the workpiece 100 while rotating. This brings the undersides of the six segmented grinding stones 14 in contact with the surface of the workpiece 100. The coolant supplied from the coolant supply device 16 passes along the coolant supply path 38 and the branching supply paths 40 in the tool, and is supplied to the contact surfaces of the grinding stones and the workpiece from the coolant supply ports 42 of the segmented grinding stones 14. From these contact surfaces, the coolant spreads in four directions and flows over the surface of the workpiece.

When optical measurement is carried out, the compressed air generator 24 produces compressed air, which is sent to the air supply pipe. This compressed air passes through the compressed air path 46 inside the tool and is discharged from the compressed air supply port 50 of the surface 34 facing the workpiece. The compressed air is discharged to the space constituted by the tool base 12, the workpiece 100, and the group of grinding stones in the ring, and then flows in the direction of the peripheral group of grinding stones. As described earlier, the segmented grinding stones 14 are in contact with the surface of the workpiece. As a result, the discharged air is blown into the tool flutes 15 in the areas between the adjacent segmented grinding stones 14.

This flow of air scatters the coolant on the surface of the workpiece, so that the coolant is eliminated. At this time, chips on the workpiece surface are also blown away. In other words, in the present invention, the means for eliminating the working fluid also functions as a means to eliminate chips. In the areas between the grinding stones, in particular, because the flow path is narrowed, the flow speed increases, so that coolant is blown away completely. Also, the compressed air generator 24 of the present embodiment generates air with a sufficiently strong pressure to force the coolant from the workpiece surface, as described above. The compressed air pressure may be of a pressure such that the coolant is not entirely blown away, but small amounts of coolant may be left in rough areas of the workpiece surface after grinding, which also enables interference fringes to be produced. Also, the shape of the exit 50 may be such that small amounts of coolant are left in rough areas of the workpiece surface, enabling interference fringes to be produced. Additionally, the compressed air generator 24 may be provided as a separate unit from the machining device 1, and compressed air supplied to the machining device 1 through a pipe or similar means.

Because optical path holes 44 in the tool base 12 are provided between the segmented grinding stones 14, by eliminating the coolant as described above, no coolant is present in the vicinity of the outlet of the optical path holes 44 and the surface of the workpiece is visible and can be measured optically. In actuality, the six optical path holes 44 are rotating along with the tool base 12. Consequently, the timing at which measurement can take place is limited to the point at which the optical path holes 44 traverse the optical axis of the measurement light. The measurement light passes through the optical path holes 44 and reaches the workpiece at the timing at which measurement is possible. The measurement light is reflected back from the workpiece 100 and again passes through the optical path holes 44, where it is reflected by the mirrors 20 back to the optical interference measurement device 18. This enables interference fringe images to be obtained, and enables measurement of the workpiece 100 surface properties.

Essentially, in optical measurement, if there is undue motion of the air in the optical path of the measurement light, it is impossible to obtain satisfactory measurement results. Wavering or shimmering of the air can cause fluctuations and other instabilities in the refractive index of the air, making the interference fringe waver as well. With ordinary commercial light wave interference measurement instruments, in order to prevent air motion interference with measurement, an apparatus, such as means for sheltering the interference light path from the surrounding area, is attached. In the present embodiment, however, air must be forced in order to eliminate coolant and debris, and it is not possible to protect the interference light path. Consequently, it is necessary to devise a means by which satisfactory measurement results can be obtained even though air is being blown. This problem is solved as described below.

In the present embodiment, compressed air is discharged between the tool base 12 and the workpiece 100. The discharged air is forced to the exit area of the optical path hole 44 at high speed. Consequently, the high-speed airstream moving in a constant direction traverses the optical path of the measurement light. This flow of gas is flowing in a constant direction, directly along the workpiece surface, and correspondes to a laminar flow.

Even with this high-speed stream of gas moving in a constant direction along the workpiece surface, the optical path is not protected, and wavering or swaying occurs in the interference fringe. Under these conditions, however, wavering occurs with rapid fluctuations. In other words, the interference fringe has the characteristic that, when the optical path crosses a high-speed flow of gas moving in a constant direction, wavering occurs at a short cycle in the interference fringe.

In the present embodiment, this characteristic is used to carry out stable optical interference measurement. Specifically, in the present embodiment, a fairly high number of interference fringe images are acquired at predetermined measurement intervals. Averaging processing is then carried out on these plural interference fringe images. The general concept behind this is to extract picture element values for the picture elements (pixels) having the same coordinates from the plural interference fringe images. These picture element values are then added, and the total is divided by the number of images. This processing is applied to all of the picture elements of the interference fringe images, enabling an averaged interference fringe image to be obtained. This averaged image indicates the interference fringe image at the point which is the center of the wavering. Image processing may also be carried out on the averaged image using the appropriate threshold value, enabling more clearly detailed images to be obtained. Additionally, the averaging processing described above is one type of processing which synthesizes plural images, but the final interference fringe image may also be obtained using another appropriate form of image processing which is different from this averaging.

Figure 19:
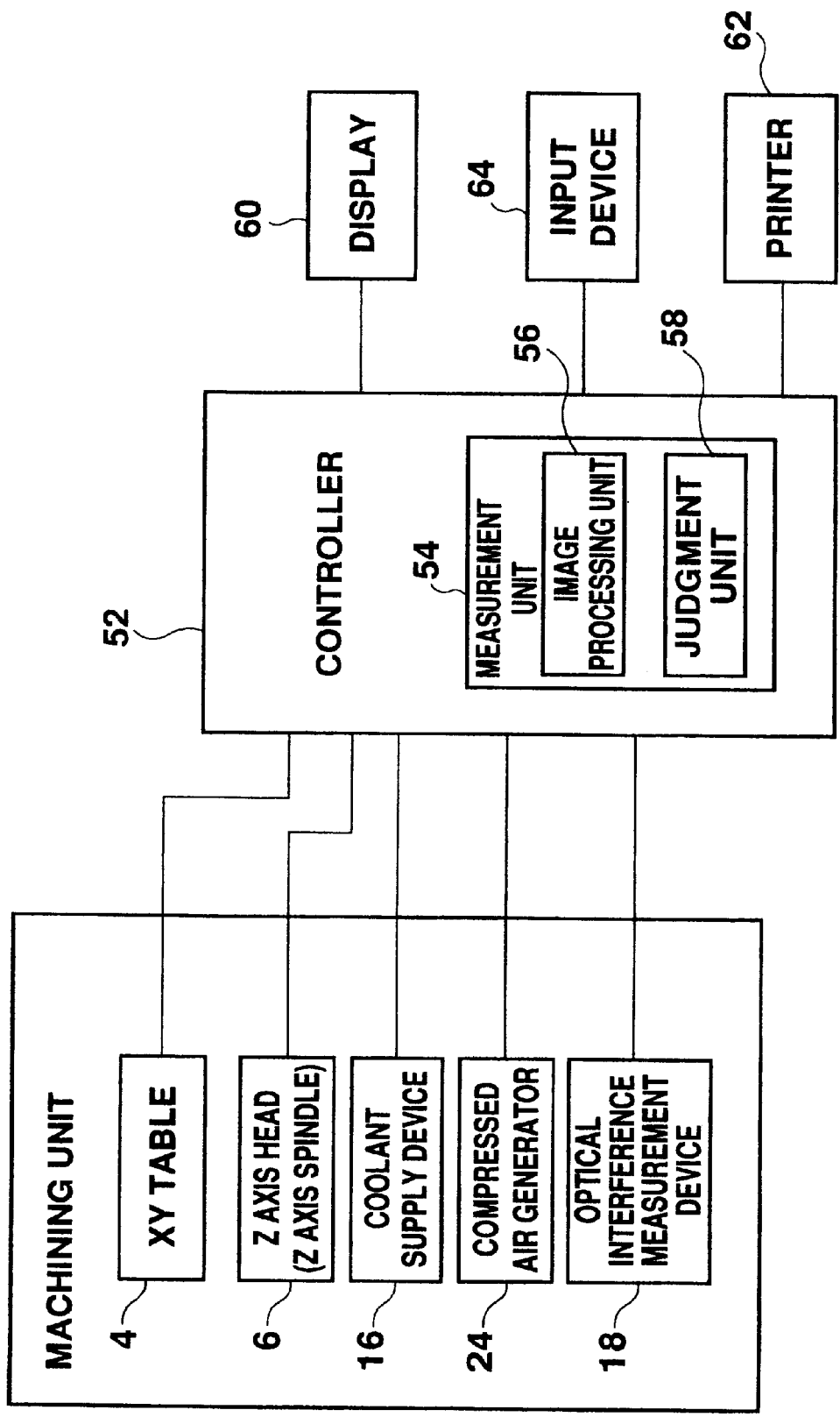
FIG. 19 is a block diagram showing the constitution of the machining device of FIG. 16.

Next, FIG. 19 shows the constitution of the machining device 1 described above, in the form of a block drawing. As shown in the drawing, a controller 52 is provided which controls the machining device. The controller 52 controls an actuator which moves an XY table 4, and the XY table 4 travels together with the workpiece 100. Also, the controller 52 outputs control signals to the Z axis head 6, which control the rotation drive and feed drive (drive, stopping, drive speed, etc.) of the Z axis spindle 8. This causes the machine tool 10 to rotate, so that it presses against the workpiece 100, and the rotation speed and amount of pressing (pushing pressure) are adjusted. Additionally, the controller 52 controls the coolant supply device 16 so that coolant is supplied to the machine tool 10 when machining is carried out. Also, the controller 52 controls the compressed air generator 24, so that compressed air is produced. As described earlier, the compressed air passes through the Z axis device and is conducted to the machine tool 10, where it is discharged from beneath the tool.

In addition, the controller 52 controls the optical interference measurement device 18. The optical interference measurement device 18 includes an internal camera device, and images of the interference fringes photographed by the camera are sent to the controller 52, which has a measurement unit 54. The measurement unit 54 has an image processing unit 56 and a judgment unit 58. In the image processing unit 56, digital data of the interference fringe images is produced on the basis of the output of the optical interference measurement device 18. The judgment unit 58 carries out judgments relating to the surface properties (ruggedness and contour, particularly height information) based on the interference fringe image data.

The range in which interference fringes can be observed is limited to areas illuminated by the measurement light. Consequently, even if measurement is carried out at a particular location, interference fringe images can only be obtained within an extremely narrow range. With that in mind, the controller 52 controls the XY table 4 and moves the workpiece 100, so that interference measurements are taken at plural locations, each one slightly offset from the others. In the image processing unit 56, the interference fringe images from plural locations obtained in this way are synthesized, enabling an interference fringe image with an appropriately wide range to be obtained. Commonly known technology may be applied for this synthesis method and the method by which the interference fringes are analyzed. For example, a method such as that described in the Japanese Patent Laid-open Publication No. H9-273908 and Patent Application H9-187763, "Recent Advances in Optical Interference Measurement Methods" (Toyohiko Yagatai, Precision Machinery 51/4/1985, p. 65–72) may be applied to the present embodiment.

Additionally, a display 60 which serves as an output device, a printer 62, and an input device 64, such as a keyboard, are connected to the controller 52. The image formed by the image processing unit 56 is displayed on the display 60. The measurement results are printed on the printer 62. The input device 64 is used by the operator to input instructions to run and stop the device, as well as other instructions. The display 60 also displays the appropriate screen displays required for operation by the operator.

The operation of the machining device of FIG. 19 is described in detail in the following. First, the workpiece 100 is secured by the operator to the XY table 4 with a clamping device. The operator then uses the input device 64 to input various types of instructions relating to machining. These instructions include information such as the extent to which machining is to be done on the workpiece 100 and the amount of machining (corresponding to the total feed volume of the Z axis spindle 8). Also, at this point, the default machining conditions (tool feed speed, cutting value (depth), grinding speed, etc.) are input. Here, the machining conditions set as default settings may also be applied.

Among the machining conditions, the cutting value (depth) indicates the amount by which the machine tool 10 pushes against the workpiece 100. The cutting value and the feed speed are generally determined as a cutting volume per unit of time. A large cutting value can cause vibration during machining, increase the degree of ruggedness in the machined surface, and adversely affect the surface contour. Conversely, if the cutting value is too low, the time required for machining is extended by that amount.

In an illustrative operation, the operator begins machining using the input device 64. The controller 52 controls the XY table 4 and positions the workpiece 100 beneath the Z axis spindle 8. In response to control by the controller 52, the Z axis spindle 8 begins moving downward while rotating, in accordance with the default machining conditions. Coolant is supplied from the coolant supply device 16 and passes through the center of the machine tool 10 and along the supply paths 38 and 40, to be supplied to the contact surfaces of the segmented grinding stones 14 and the workpiece 10.

After machining has begun, manual or automatic adjustment of the machining conditions is performed based on the measurement results from the optical interference measurement. Measurement is carried out on-the-fly, while the machine tool 10 is rotating.

"Manual Adjustment"

When an appropriate period of time has elapsed since start of machining, the operator uses the input device 64 to command measurement. Alternatively, measurement may be carried out automatically by the controller 52 after a predetermined time has elapsed, or when the predetermined amount of machining has been completed (when the workpiece 100 has moved as much as the predetermined feed).

The controller 52 controls the compressed air generator 24 so that compressed air is produced. The compressed air is conducted along the air supply path and through the Z axis device to the machine tool 10. The compressed air passes along the compressed air path 46 in the tool, and is discharged from the air supply port 50 on the underside of the tool (the surface 34 facing the workpiece). As described earlier, this eliminates coolant and chips in the vicinity of the optical path hole 44. Under these conditions, measurement is carried out by the optical interference measurement unit 18.

In the image processing unit 56 of the controller 52, images sent in sequential order from the optical interference measurement unit 18 undergo appropriate image processing and are stored in memory. Using these images, the judgment unit 58 judges whether or not there is any ruggedness, and evaluates the contour, particularly the height. The results of the judgment of the height and other parameters are displayed on the display 60, along with the interference fringe image, and are printed by the printer 62.

The operator reviews the measurement results and, if necessary, uses the input device 64 to adjust the machining conditions. For example, among surface properties, the operator may focus on roughness, and may correct the default cutting conditions to minimize roughness. By so doing, height can be added to the flatness of the workpiece 100.

When adjustment of the machining conditions has been completed, the controller 52 stops the irradiation of the measurement light by the optical interference measurement unit 18, and halts production of compressed air by the compressed air generator 24.

Preferably, the measurement and machining condition adjustments described above are performed a plurality of times, at appropriate intervals. In the process described above, compressed air is discharged only when measurement is carried out, but compressed air may also be discharged continuously. Also, optical interference measurements may be carried out consecutively, without leaving intervals of time between them.

If the machining conditions have not been changed, the controller 52 maintains the default machining conditions. If instructions have been issued for changes in the machining conditions, machining is carried out as indicated by those instructions. The controller 52 continues the machining until the machining volume initially input has been reached, and then terminates the machining.

"Automatic Adjustment"

With automatic adjustment, measurement is performed automatically by the controller 52 at predetermined time periods, or at points at which a predetermined amount of machining has been compiled (the workpiece 100 has moved a predetermined amount).

When the measurement timing has been reached, the controller 52 executes the measurement processing in the same way as the manual adjustment procedure described above. In the measurement unit 54, the surface properties are determined from the interference fringe image, and the machining conditions are adjusted automatically so as to obtain the appropriate surface properties.

For example, the judgment unit 58 determines the height information among the surface properties, and compares this height size to the appropriate reference value. When the height is lower than the reference value, the controller 52 maintains the current machining conditions, while when the height is higher than the reference value, the controller 52 lowers the feed volume or otherwise adjusts the machining conditions so that a uniform height is obtained. Additionally, the roughness is compared to a second reference value, and, when the roughness is lower than the second reference value, a judgment is made that the machining time can be shortened without causing problems, and other parameters, such as the feed volume, are increased. Multiple reference values such as those described above may be provided, and the machining conditions may be adjusted in a plurality of stages. Furthermore, machining conditions may also be adjusted continuously in response to the surface properties.

In addition, the judgment unit 58 checks for abnormal distortion in the machined surface. When the clamping device is clamping the workpiece 100 with excessive pressure, or that the pressure is unevenly balanced among a number of locations, abnormal distortion may occur in the workpiece 100. When abnormal distortion is detected, the controller 52 stops the machining, and "Abnormal Distortion" is displayed on the display 60 to alert the operator. This processing may also preferably be carried out when machining first begins.

As with manual adjustment, measurement and machining conditions are optimally adjusted a plurality of times, at appropriate intervals, though discharge of compressed air may be carried out continuously. Optical interference measurement may also be carried out continuously, without leaving intervals in between. Surface properties may also be monitored in an ongoing manner, and machining conditions adjusted in response to changes in the surface properties.

In the above manner, machining is performed while the controller 52 adjusts the machining conditions as necessary, and then terminates machining at the point when the amount of machining initially input has been reached. The Z axis spindle 8 is then pulled upward and stopped.

The above is a description of a preferable embodiment of the present invention. According to the present embodiment, on-the-fly optical interference measurement of the workpiece surface is enabled, using a simple constitution as shown in FIGS. 17A and B, in which segmented grinding stones 14, optical path holes 44, compressed air paths 46 and coolant supply paths 38 are arranged. Consequently, setup changing in which the workpiece is removed from the machining device while machining is in progress and is set on the measurement device is no longer necessary, and machining time and machining costs can both be reduced.

In addition, it is possible to easily ascertain during machining whether or not the machining conditions are satisfactory, and to measure the machining accuracy so that machining accuracy can be improved and defective machining can be prevented.

Also, according with a configuration as described in the present embodiment, it is possible to monitor distortion caused by the workpiece clamps, making it possible to detect abnormal distortion caused by the clamps and thus prevent machining defects at this point, as well.

Additionally, in the present embodiment, the results of the optical interference measurement can be fed back to the machining conditions, so that machining conditions can be automatically adjusted and machining accuracy can be improved. Conventionally, machining conditions are adjusted by the operator based on his or her judgment, with a result that machining accuracy greatly depends on the skill level of the operator. With the present invention, however, accurate machining can be carried out, regardless of the skill level of the operator. Additionally, by adjusting the machining conditions, the machining speed can be increased to near its maximum with a result that the present invention also contributes to reduction of the machining time at this point.

An example variation of the present embodiment uses a compressed gas other than compressed air. Also, although optical interference measurement was described in the above example, other forms of optical measurement may also be carried out. For example, a laser-type indicator may be used to measure the position (height) of the workpiece 100, in which case the present invention may be applied with the same level of effectiveness as in the description above. Additionally, although grinding machining was applied in the present embodiment of this invention, other types of machining may be used with the present invention.

Because the optical axis 22 is exposed to the atmosphere, there is a possibility of the interference fringe wavering or the mirrors 20 becoming dirty. To prevent this, the invention may be configured so the optical axis 22 is sheltered from the atmosphere. In addition, the light waves passing through the optical axis 22 may also be conducted by means of optical fibers so that the mirrors 20 are eliminated and, when a lens is provided at the outlet where the light waves exit, parallel light beams may be generated in such a way that surface area the required for the interference can be assured.

The technology of the first embodiment and the second embodiment may be combined within the invention of the present application. As described earlier, the first embodiment is not restricted to a lapping device, but may also be applied to other types of machining devices. Likewise, the second embodiment is not restricted to grinding machining devices, but may also be applied to other types of machining devices.

Embodiment 3

The description provided in a third embodiment of the present invention corresponds to Japan Patent Application H10-91085, filed on Apr. 3, 1998, to which this application claims priority under the Paris Convention.

The present invention relates to a machining device with a measurement function and to a method of optical measurement, and particularly to a process by which optical measurement is carried out targeting a workpiece surface while machining of the workpiece is in progress.

The background of the invention relating to the third embodiment is found in the description of the second embodiment. In other words, in machining such as mirror surface machining and grinding machining, the ability to conduct on-the-fly optical measurements is desired.

An objective of the present invention pertaining to the third embodiment is to provide a machining device having a function to carry out on-the-fly optical measurement targeting the surface of a workpiece while machining is in progress, and to provide an optical measurement method which enables on-the-fly measurement.

In order to achieve the above objectives, the machining device of the present invention includes holding means for holding the workpiece, machining means for machining the workpiece, working fluid supply means for supplying working fluid for the workpiece; measurement means for optical measurement by irradiation of an optically illuminated portion of the surface of the workpiece with light, and gas flow generation means for producing a high-speed gas flow in a constant direction along the workpiece surface on the optically illuminated portion. Working fluid is eliminated from areas of the workpiece targeted for optical measurement using said high-speed gas flow to, thus enable on-the-fly optical measurement.

According to the present invention, working fluid on the workpiece is eliminated from areas irradiated by light, and those areas are irradiated with light, enabling on-the-fly optical measurement. However, satisfactory measurement results cannot be obtained simply by forcing a gas to eliminate the working fluid because wavering or shimmering can occur, and this adversely affects measurement accuracy. For example, based on optical interference measurement, the interference fringe image wavers as a result of wavering of the air, making it impossible to obtain the appropriate interference fringes. In order to solve this problem, according to the present invention, a high-speed flow of gas in a constant direction (corresponding to laminated gas flow) is generated along the surface of the workpiece, with the flow of gas traversing the optical path. Even if this flow of gas is interposed, wavering occurs in the interference fringe image. However, the interference fringe has the characteristic that, under a high-speed gas flow in a constant direction, wavering occurs at short cycles. Making use of this characteristic, processing, such as averaging processing, can be carried out on interference fringes obtained in appropriately long intervals, to obtain stable measurement results.

In this way, the device of the present invention, rather than eliminating fluctuation in the measurement results, generates fluctuations at an intentionally short cycle using a high-speed gas flow in a constant direction, to obtain more stable and satisfactory measurement results.

In another aspect of the present invention, the gas flow generation means described above includes a nozzle unit having a long, narrow discharging slit parallel to the surface of the workpiece, in the vicinity of the workpiece surface, and a gas supply pipe unit which supplies compressed gas to the nozzle unit and discharges it from the discharging slit described above.

It may also be preferable that the machining device of the present invention have a protective cover provided between the machine tool and the areas of the workpiece surface which are illuminated with light, and that this protective cover be established in relation to the workpiece surface such that the protective cover obstructs scattering of working fluid from the machine tool to the areas illuminated with light, and thus prevents disturbance of the high-speed gas flow described above.

In this manner, a high-speed flow of gas can be generated in a constant direction to areas illuminated with light, in a comprehensive and appropriate state.

It may further be preferable for the machining device of the present invention to include machining control means for automatic adjustment of machining conditions for the machining means described above, by feeding back the measurement results using the measurement means described above.

Measurement results can be fed back to the machining conditions and defective machining prevented before it occurs, thus enabling improved machining accuracy.

For example, the measurement means described above may be an optical interference measurement instrument which measures the surface properties of the workpiece described above.

Also, for example, the measurement means described above may be a laser-type measurement instrument which measures the position of the workpiece surface.

As described earlier, according to the present invention, a high-speed gas flow is generated in a constant direction along the surface of the workpiece at areas illuminated by light to enable satisfactory on-the-fly optical measurement. As a result, it is no longer necessary to remove the workpiece from the machining device to place it on the measurement device, and both machining time and the machining cost can be reduced. Furthermore, because on-the-fly measurement is possible, judgments as to whether or not the machining conditions are satisfactory, and judgments concerning the machining accuracy, can be more easily made. Additionally, it becomes possible to feed back the measurement results to the machining conditions, thereby preventing machining defects and improving machining accuracy. Using this machining device enables detection of clamping distortion which is caused by excessive clamping pressure, and machining defects can also be prevented at that point.

Additionally, the optical measurement method of the present invention may be configured as an optical measurement method which carries out optical measurement by irradiating the workpiece surface of the machining target with light, and with the workpiece being held in the machining device, a high-speed flow of gas moving in a constant direction is generated along the workpiece surface in areas illuminated by light in order to carry out the optical measurement on the surface of the workpiece, thus eliminating working fluid supplied to the workpiece from the areas illuminated with light, and enabling on-the-fly measurement.

According to this aspect, the results obtained with the machining device are obtained in a format called a method.

This third embodiment is described in detail below, with reference to FIGS. 20 to 24.

In the present embodiment, the present invention is applied in a machining device which carries out mirror surface finishing, by means of cutting using a monocrystal diamond bite, ELID grinding, or other finishing.

Figure 20:
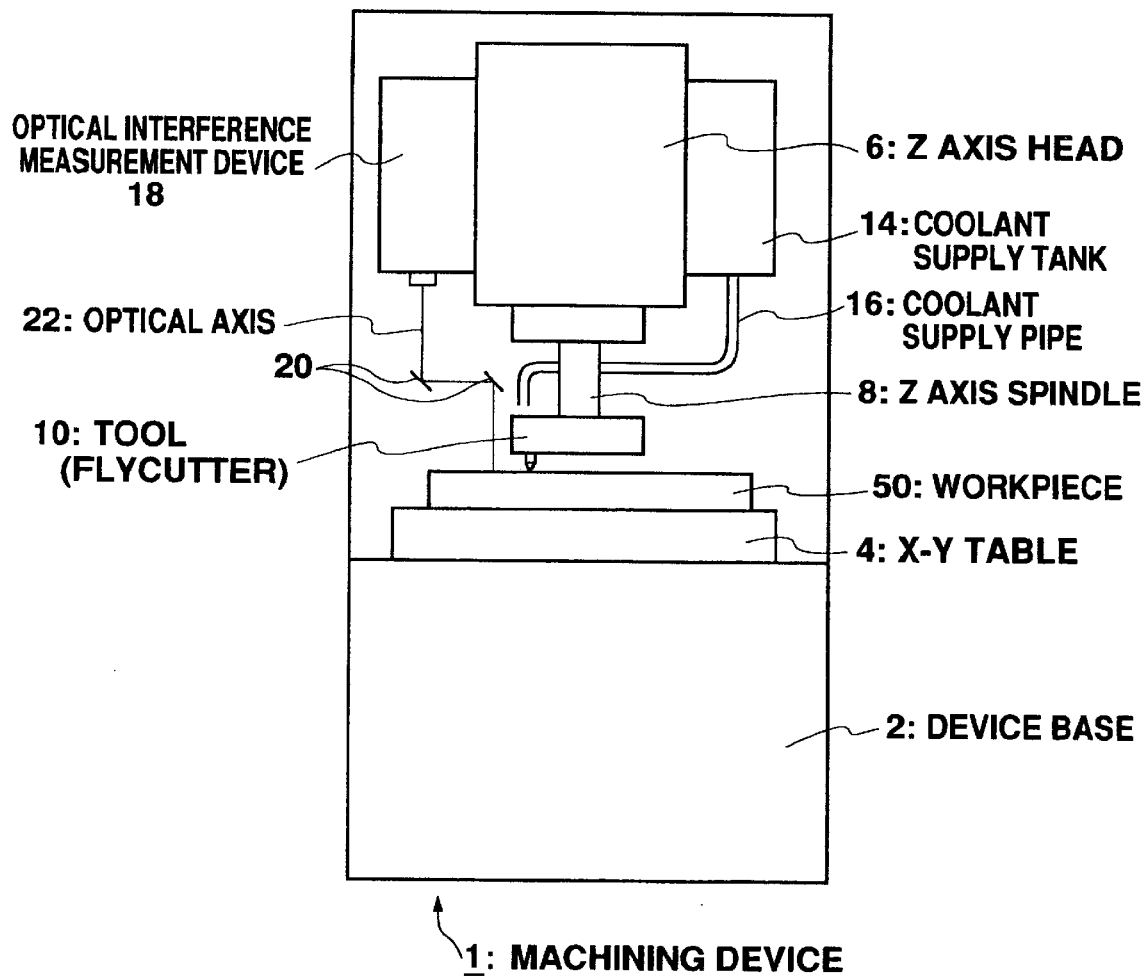
FIG. 20 is a drawing showing the machining device of the third embodiment of the present invention.
Figure 21A:
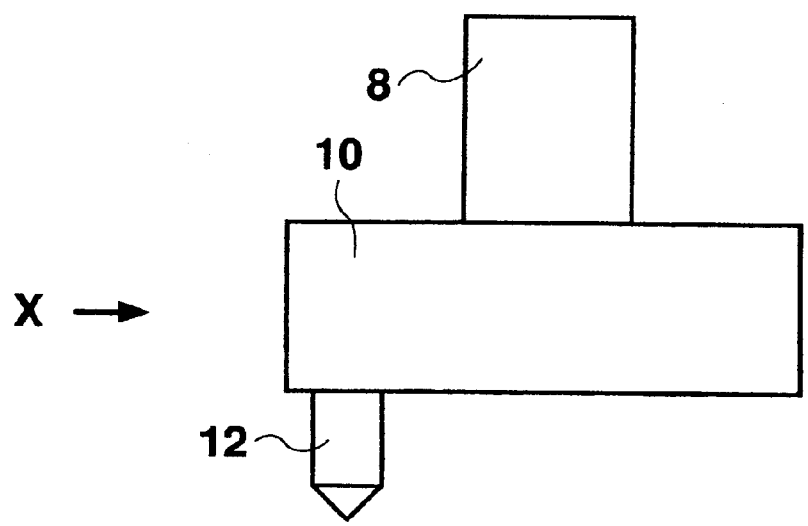
FIGS. 21A and 21B are drawings showing the flycutter of the machining device of FIG. 20.
Figure 21B:
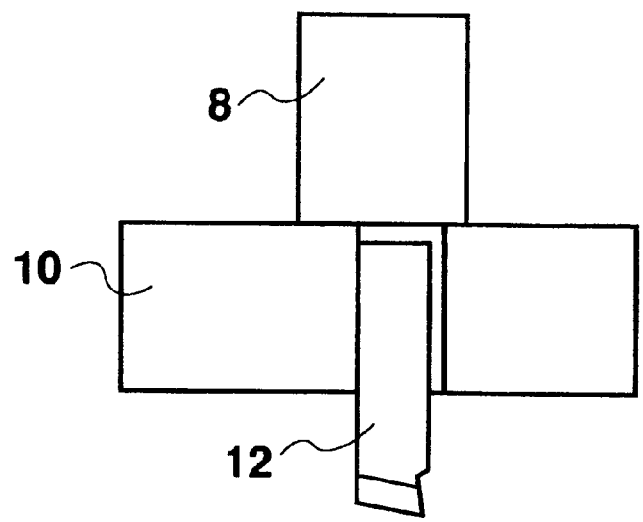

FIG. 20 shows the machining device 1 of the present embodiment. With this device, mirror surface finishing is carried out with a single point, using a flycutter 10. An XY table 4 is positioned on the device base 2. The XY table 4 is capable of traveling in the horizontal direction by means of an actuator mechanism (not shown) (in the present embodiment, the X and Y axes are set in the horizontal direction in mutually orthogonal positions, while the Z axis is set in the vertical direction). The workpiece 50 is secured to the XY table 4 by means of a clamping device (not shown).

Additionally, a Z axis head 6 is secured to the XY table 4, on the device base 2. The Z axis head 6 supports a Z axis spindle 8. The Z axis head 6 has a built-in motor and actuator mechanism and rotates the Z axis spindle 8, as well as traveling in the Z axis direction. When machining is done, the Z axis spindle 8 is fed in the downward direction while rotating.

A flycutter 10 is installed in the tip of the Z axis spindle 8 as the tool. As shown in enlarged views in FIGS. 21A and B, the flycutter 10 has a circular shape, and is configured with a tool attachment groove in one location on the outer periphery, with a bite 12 attached in this attachment groove. As the Z axis spindle 8 moves downward while rotating, the bite 12 comes in contact with the workpiece 50 to thereby perform machining.

Returning to FIG. 20, a coolant supply tank 14 is attached to the device base 2. Coolant is stored in the coolant supply tank 14. The coolant is a type of working fluid, and is used for cooling of the workpiece, and to wash away chips produced at the section of the workpiece being machined. Inside the coolant supply tank 14, a coolant supply pipe 16 is provided. During machining, the coolant is supplied to the workpiece 50 and to peripheral areas through this supply pipe 16.

In addition, an optical interference measurement device (hereafter referred to as "measurement device") 18 is attached to the device base 2. The measurement device 18 may be a common Fizeau device. The measurement device 18 irradiates light in a collimated beam (optical axis 22) in the downward direction. This beam is on the workpiece 50 by two mirrors 20 and arrives. The optical beam is then reflected from the surface of the workpiece 50 and is reflected back to the measurement device 18. The reflected light is used to generate an interference fringe image in the measurement device 18. The interference fringe image is captured by a camera incorporated in the measurement device 18. This interference fringe image is then used to detect the surface properties, including aspects such as waviness, roughness, and contour.

Figure 22:
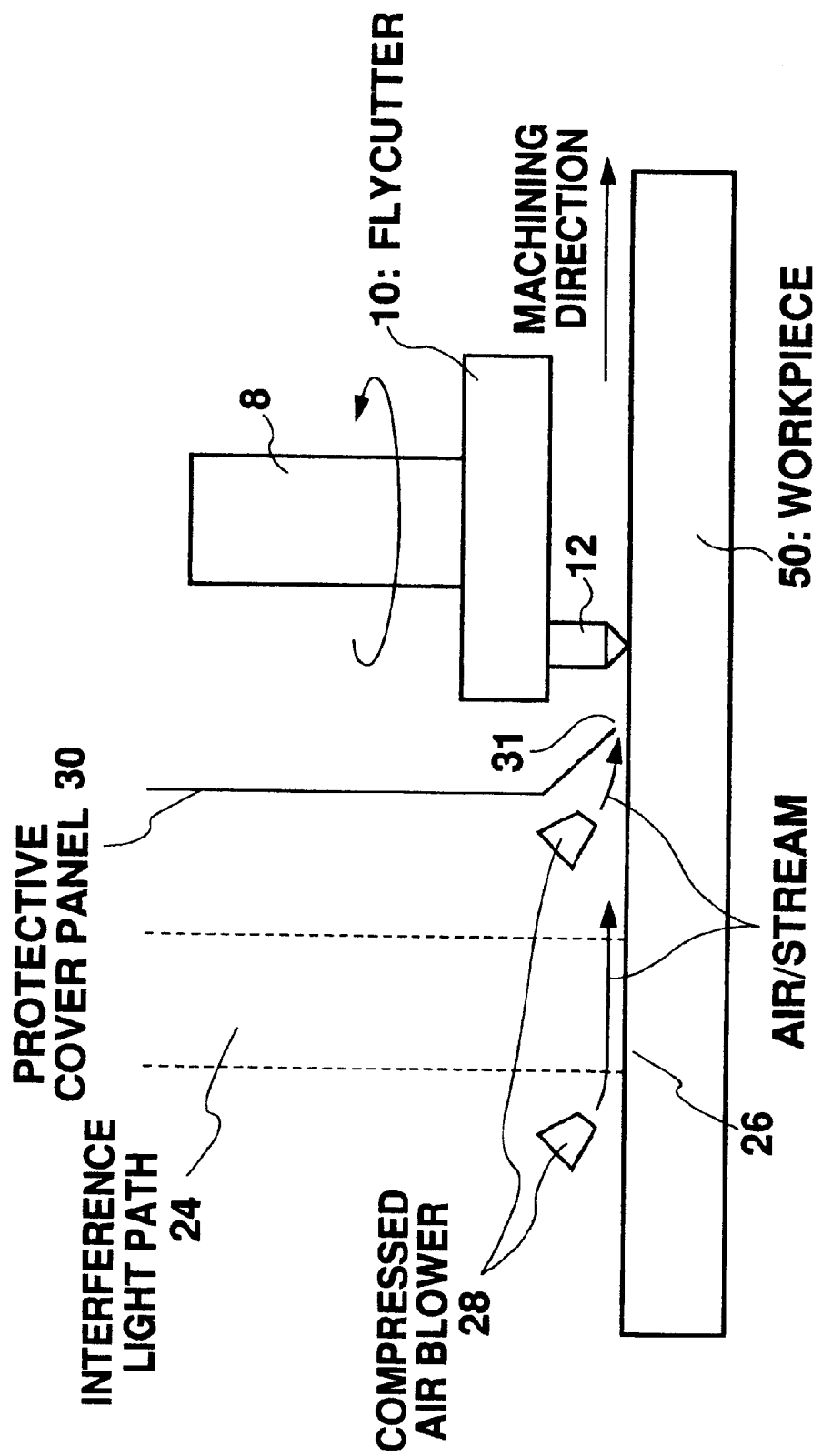
FIG. 22 is a drawing showing the flycutter and the workpiece of the machining device of FIG. 20, along with the compressed air blower of the third embodiment of the present invention.

FIG. 22 is an enlarged view of the workpiece 50 and the flycutter 10, shown as a model. The flycutter 10 rotates, causing the bite 12 to cut into the workpiece 50. The workpiece 50 moves together with the XY table (not shown) to the left, causing the flycutter 10 to move correspondingly to the right. As a result, the direction of machining is to the right. The interference light path 24 is the path along which the light generated by the measurement device 18 travels. The interference light path 24 is separated from the flycutter 10 and positioned at an appropriate distance from the flycutter 10, on its left. The area 26 illuminated by the light is the section irradiated by the light passing along the interference light path 24, on the surface of the workpiece 50.

Figure 23:
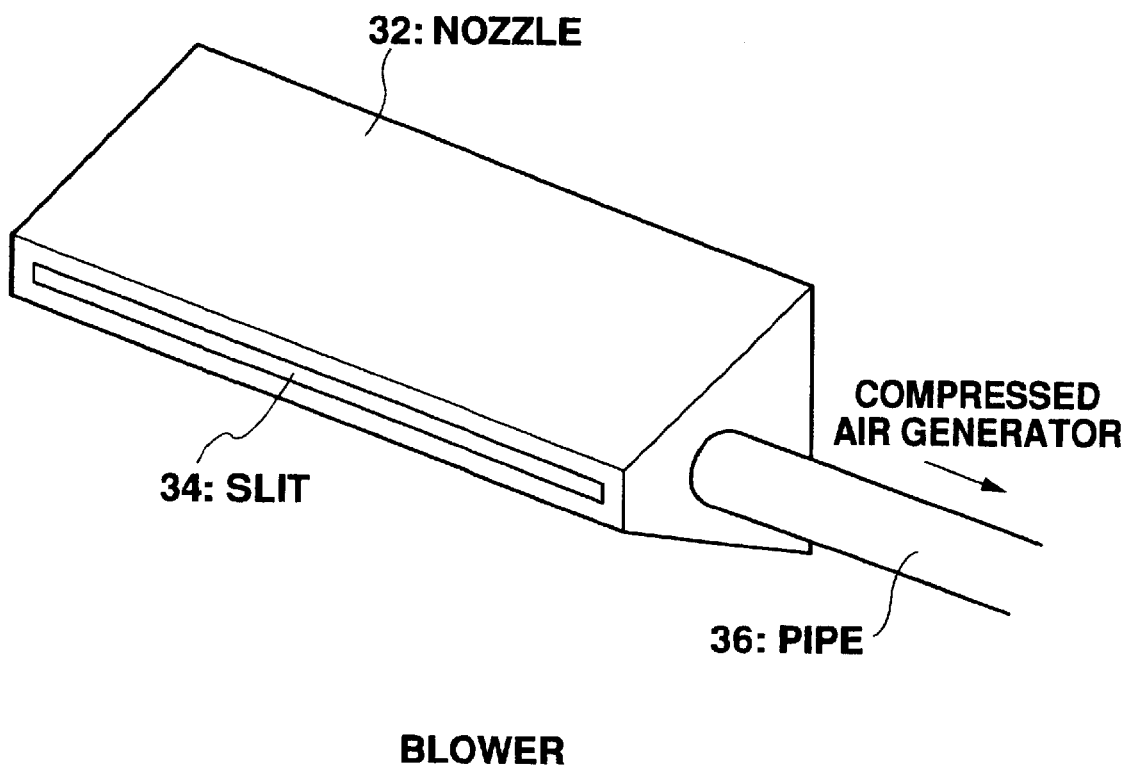
FIG. 23 is a drawing showing an enlarged view of the compressed air blower.

A feature of the present embodiment is that a compressed air blower (hereafter referred to as "blower") 28 is provided which generates a high-speed flow of gas in a constant direction along the surface of the workpiece at the area 26 illuminated by the light. As shown in FIG. 23, the nozzle 32 of the blower 28 is aerially suspended and has a long, thin shape, with a constant cross-section. On one surface of the nozzle 32, a long, thin slit 34 is provided, as if to extend the nozzle in the longitudinal direction. A pipe 36 is connected to the nozzle 32, and is also connected to the compressed air generator. Compressed air passes from the compressed air generator through the pipe 36 to the nozzle 32, and is discharged from the slit 34.

Returning to FIG. 22, the nozzle 32 of the blower 28 is attached in relation to the device base 2, but is attached in such a way that it can move. There are two nozzles 32, one on either side of the interference light path 24. The positions of the nozzles 32 are set such that the slits 34 are in close proximity to and parallel to the workpiece surface. In addition, the two nozzles 32 are positioned facing in the same direction. The orientation of the nozzles 32 is such that the slits 34 are facing in the direction of the flycutter 10, meaning that the compressed air is discharged in the direction of the flycutter 10.

A protective cover panel 30 is provided between the interference light path 24 and the flycutter 10. The protective cover panel 30 is attached to the device base 2, and is installed in such a way that it stands on the surface of the workpiece 50. A portion of the coolant directed to the flycutter 10 is reflected into the air, but the protective cover panel 30 prevents this coolant from reaching the interference light path 24 or the area 26 illuminated by the light. The protective cover panel 30 also prevents the flow of air of the area 26 illuminated by the light from being disturbed by the rotation of the flycutter 10.

The lower end of the protective cover panel 30 is bent in the direction of the flycutter 10, and a predetermined clearance is provided between the workpiece 50 and the lower end of the cover. Air discharged from the nozzle 32 of the blower 28 passes through this clearance 31 and escapes smoothly in the direction of the flycutter 10.

In the present embodiment, by providing a construction with the features described above, on-the-fly optical interference measurement can be carried out as described below. During machining, a large volume of coolant is supplied from the coolant supply tank 14 to the workpiece 50. This coolant flows over the workpiece 50 and to the peripheral area. Residue produced by machining is also carried away with the coolant. However, because the coolant is scattered by the rotation of the flycutter 10, chips and coolant pass through the illuminated area 26 on the workpiece 50, making optical interference measurement impossible.

Given these circumstances, in the present embodiment, compressed air is used to force debris and coolant away from the illuminated area 26 to thereby expose the illuminated area 26. Also, any coolant which has scattered from the flycutter 10 strikes the protective cover panel 30 and falls downward, so that it does not reach the interference light path 24. As a result, the measurement light is able to travel along the interference light path 24 and irradiate the illuminated area 26.

However, satisfactory measurement results cannot be obtained simply by forcing air in any desired direction. Wavering or shimmering of the air can cause fluctuations and other instabilities in the refractive index, leading to interference fringe waver. Currently, with ordinary commercial light wave interference measurement instruments, in order to prevent wavering of the air which interferes with measurement, an apparatus, such as means for sheltering the interference light path from the surrounding area, is attached. With the present embodiment, however, as air must be forced to eliminate coolant and debris, and it is not possible to protect the interference light path. Consequently, it is necessary to devise a means by which satisfactory measurement results can be obtained even when air is being blown.

Therefore, in the present embodiment, a blower 28 is provided, as described above. The slits 34 in the nozzles 32 are positioned in close proximity to and parallel to the workpiece surface, and compressed air is discharged from these slits 34. This compressed air travels at high speed in the constant direction indicated by the arrow in FIG. 22, meaning in the direction of the flycutter 10. Because this flow of gas is flowing in a constant direction directly along the workpiece surface, it can be thought of as a laminar flow.

Even with this high-speed flow of gas moving in a constant direction along the workpiece surface, the optical path is not protected, and wavering or swaying occurs in the interference image. Under these conditions, however, wavering occurs with rapid fluctuations. In other words, the interference fringe has the characteristic that, when the optical path crosses a high-speed flow of gas moving in a constant direction, wavering occurs at a short cycle in the interference fringe.

In the present embodiment, this characteristic is used to carry out stable interference measurement. First, a high-speed flow of air is generated in a constant direction, and coolant and debris are removed. A plurality of interference images are then obtained at predetermined measurement intervals. Here, the timing of the intervals at which interference fringes are obtained is set in such a way that they are sufficiently shorter than the length of one cycle of interference fringe wavering. Also, the predetermine measurement period at which images are obtained is set in such a way that it is sufficiently longer than the length of one cycle of interference fringe wavering. This makes it possible to obtain a plurality of interference fringe images encompassing multiple cycles. The setting of timing and period is done as described above in Embodiment 2.

Averaging processing is then carried out on the plurality of interference fringe images obtained in order to extract picture element (pixel) values for the picture elements having the same coordinates from the plural interference fringe images. These picture element values are then added, and the total is divided by the number of images. This processing is applied to all picture elements of the interference fringe images, enabling an averaged interference fringe image to be obtained. This averaged image indicates the interference fringe image at the point which is the center of the wavering. Image processing may also be carried out on the averaged image using an appropriate threshold value, enabling clearler and more detailed images to be obtained. Additionally, although the averaging processing described above is one type of processing which synthesizes plural images, the final interference fringe image may also be obtained using another appropriate form of image processing which is different from this averaging.

According to the present embodiment, using the method described above, stable interference fringe measurement can be actualized even while machining is in progress. Here, the blower 28 which generates a high-speed flow of gas in a constant direction has two functions in combination, as follows: (1) a function which blows away coolant and debris, and exposes the illuminated area 26, and (2) a function which enables stable measurement not by eliminating wavering of the interference fringes, but by intentionally generating shot cycle wavering.

Gradual and significant changes are caused in interference fringes by factors such as the room temperature, barometric pressure, and humidity. Because the interference fringes waver at short cycles under the conditions of the present embodiment as described above, it is also possible to set a relatively short interference fringe measurement interval. Consequently, an advantage is obtained that measurement of interference fringes can be carried out without being influenced by factors such as the room temperature.

Figure 24:
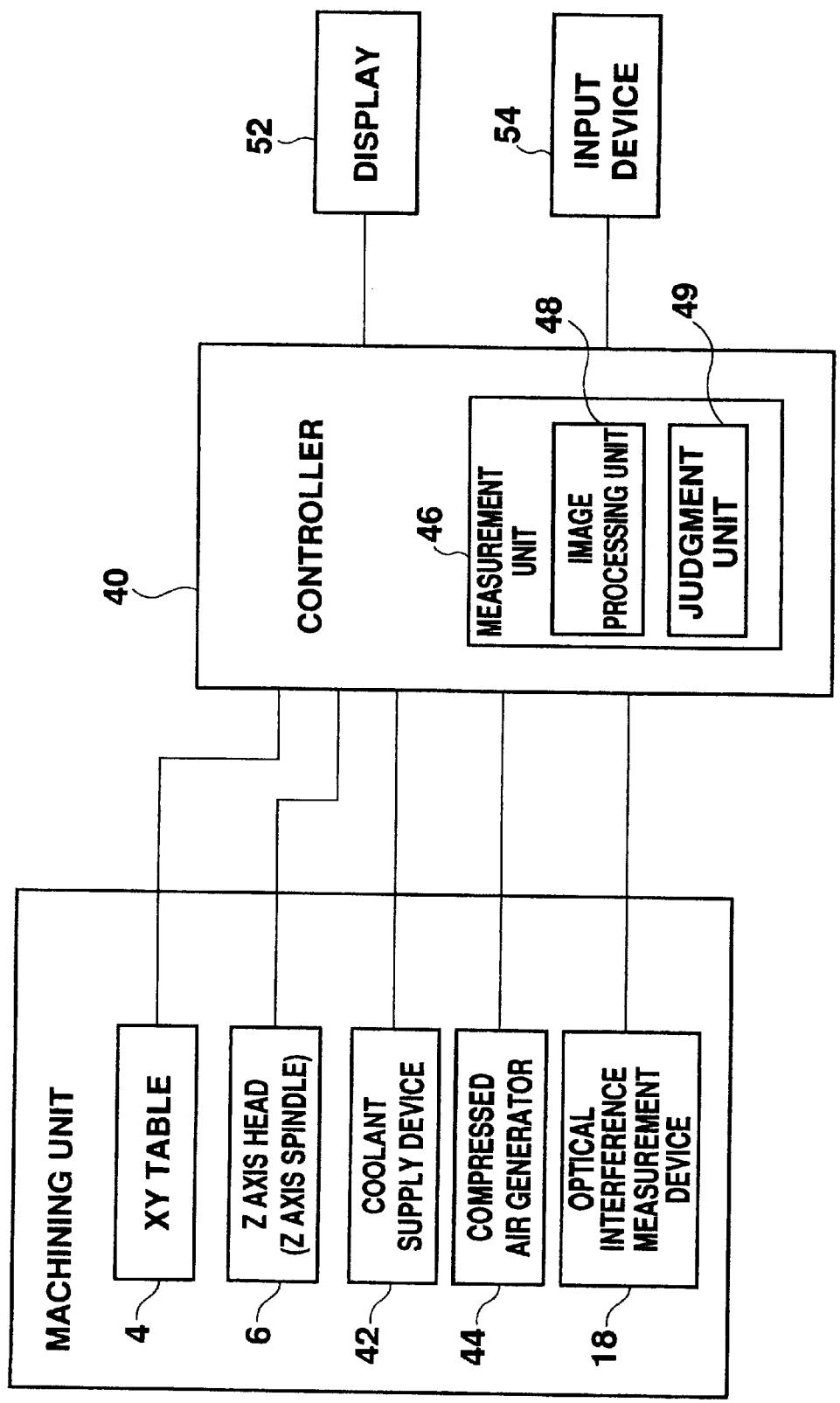
FIG. 24 is a block drawing showing the constitution of the machining device of FIG. 20.

FIG. 24 shows the constitution of the machining device 1 described above in the form of a block drawing. As shown in the drawing, a controller 40 is provided which controls the machining device. The controller 40 controls an actuator which moves an XY table 4, and the XY table 4 travels together with the workpiece 50. Also, the controller 40 outputs control signals to the Z axis head 6, which controls the rotation drive and feed drive (drive, stopping, drive speed, etc.) of the Z axis spindle 8. This causes the flycutter 10 of the measuring jig 12 to rotate, so that it presses against the workpiece 50, and the rotation speed and amount of pressing (pushing pressure) are adjusted. Additionally, the controller 40 controls the coolant supply device 42, so that coolant is supplied to the flycutter 10 and the workpiece 50 when machining is carried out.

Also, the controller 40 controls the compressed air generator 44 which produces compressed air. As described earlier, the compressed air passes through the pipe 36 of the compressed air blower 28 and is discharged from the slits 34 of the nozzles 32.

In addition, the controller 40 controls the optical interference measurement device 18. The optical interference measurement device 18 has an internal camera device, and images of the interference fringes captured by the camera are sent to the controller 40.

The controller 40 is provided with a measurement unit 46. The measurement unit 46 has an image processing unit 48 and a judgment unit 49. In the image processing unit 48, digital data of the interference fringe images is produced on the basis of the output of the optical interference measurement device 18. Averaged images are formed through averaging processing carried out on a plurality of images from the same location obtained within a predetermined measurement period, as described earlier. The judgment unit 49 carries out judgments relating to the surface properties (ruggedness, etc.) based on the interference fringe image data.

Also, as shown in FIGS. 20 and 22, the range in which interference fringes can be observed is limited to the illuminated area 26 irradiated by the measurement light. Consequently, even if measurements are carried out at a single location, interference fringe images can only be obtained within an extremely narrow range. The controller 40 therefore controls the XY table 4 and moves the workpiece 50, so that interference measurements are taken at multiple locations, each slightly offset from the others. In the image processing unit 48, the interference fringe images (averaged images) from the plurality of locations obtained in this way are synthesized, enabling an appropriately wide range of interference fringe images to be obtained. Commonly known technology may be applied for this synthesis method and the method by which the interference fringes are analyzed. For example, a method such as that described in the Public Patent Disclosure Bulletin Kokai H9-273908 and Patent Application H9-187763, "Recent Advances in Optical Interference Measurement Methods" (Toyohiko Yagatai, Precision Machinery 51/4/1985, p. 65–72) may be applied to the present embodiment.

Additionally, a display 52 which serves as an output device and an input device 54, such as a keyboard, are connected to the controller 40. The image formed by the image processing unit 48 is displayed on the display 52. The input device 54 is used by the operator to operate the device. The display 52 also displays the appropriate screen displays required for operation by the operator.

Next, the operation of the machining device 1 of the present embodiment is described. First, the workpiece 50 is secured by the operator to the XY table 4, using a clamping device. The operator then uses the input device 54 to input various types of instructions relating to machining. These instructions may include information as to the extent to which machining is to be done on the workpiece 50 or the amount of machining (corresponding to the total feed volume of the Z axis spindle 8). Also, at this point, the default machining conditions (tool feed speed, cutting value (depth), rotating speed, etc.) are input. Here, the machining conditions set as default settings may also be applied.

Among the machining conditions, the cutting value (depth) indicates how far the flycutter 10 will be pushed against the workpiece 50. With the tip of the bite 12 of the flycutter 10 at the exact point where it simply presses against the workpiece 50, machining is not carried out, because the bite 12 is not cutting into the workpiece 50. As the bite 12 begins to press against the workpiece 50, it bites into it, cutting away the surface of the workpiece 50. The amount of pushing at this point is the cutting value. If the cutting value is large, the amount of waviness caused by vibrations from the machining and other factors increases, which adversely affects the surface contour. If the cutting value is insufficient, however, the amount of time required for machining is increased. The default value for the cutting depth should be set to the largest possible value within a range in which the surface contour is not adversely affected beyond tolerance.

The operator instructs that machining begin, using the input device 54. The controller 40 controls the XY table 4 and positions the workpiece 50 beneath the Z axis spindle 8. In response to control by the controller 40, the Z axis spindle 8 begins moving downward while rotating, in accordance with the default machining conditions, and, when the bite 12 is cutting into the workpiece 50 at an appropriate depth, the XY table 4 is controlled and machining is carried out. After machining has begun, the results of the optical interference measurements are used to carry out manual or automatic adjustment of the machining conditions. Measurement can be carried out on-the-fly, while the flycutter 10 is rotating.

"Manual Adjustment"

When an appropriate period of time has elapsed since the beginning of machining, the operator uses the input device 54 to instruct that measurement be carried out. Alternatively, measurement may be carried out automatically by the controller 40 at predetermined intervals, or the predetermined amount of machining has been completed (when the Z axis spindle 8 has moved as much as the predetermined feed).

The controller 40 controls the XY table 4 to move the workpiece 50, and to bring the measurement light to the predetermined position on the illuminated area 26. Also, the nozzle 32 of the compressed air blower 28 moves, and is set in the predetermined position in relation to the illuminated area 26. Next, compressed air is generated by the compressed air generator 44 in response to control by the controller 40. The compressed air passes through the pipe 36 of the compressed air blower 28, and is discharged through the slits 34 of the nozzles 32. This generates a high-speed flow of air in a constant direction along the surface of the workpiece, to the illuminated area 26. In this state, measurement is carried out by the optical interference measurement device 18. As described earlier, a plurality of images are photographed for a predetermined measurement time, and are sent to the controller 40 in sequential order. Also, by moving the XY table 4, measurements can be carried out sequentially, targeting a plurality of locations which are slightly offset from each other.

In the image processing unit 48 of the controller 40, images sent in sequential order from the optical interference measurement device 18 undergo appropriate image processing and are stored in memory. Averaging processing and synthesis processing are carried out based on the plural images stored in memory, and a final interference fringe image is created. Using this image, the judgment unit 49 judges the ruggedness and other surface properties. The results of the judgment of the surface properties are displayed on the display 52, along with the interference fringe image.

The operator reviews the measurement results on the display 52 and, if necessary, uses the input device 54 to adjust the machining conditions. For example, the operator may focus on ruggedness among the other surface properties, and may correct the default cutting conditions to minimize ruggedness. By doing this, height can be added to the flatness of the workpiece 50.

When adjustment of the machining conditions has been completed, the controller 40 stops the irradiation of measurement light from the optical interference measurement device 18, and stops the production of compressed air by the compressed air generator 44.

Preferably, the measurement and machining condition adjustments described above are done plural times at appropriate intervals. In the process described above, compressed air is discharged only when measurement is carried out, but compressed air may also be discharged continuously. Also, optical interference measurements may be carried out consecutively, without any interval of time between measurements.

If the machining conditions have not been changed, the controller 40 maintains the default machining conditions. If instructions have been issued for changes in the machining conditions, machining is carried out as indicated by those instructions. The controller 40 continues the machining until the machining volume initially input has been reached, and then terminates the machining.

"Automatic Adjustment"

With automatic adjustment, measurement is automatically carried out by the controller 40. The measurement timing consists of a period of time from when the machining first begins to when the predetermined time has elapsed, or when the predetermined amount of machining has been done (when the Z axis spindle 8 has moved as much as the predetermined feed).

When the measurement timing has been reached, the controller 40 executes the measurement processing in the same way as the manual adjustment procedure described above. In the measurement unit 46, the surface properties are determined from the interference fringe image, and the machining conditions are adjusted automatically so as to obtain the appropriate surface properties.

For example, the judgment unit 49 may determine ruggedness among the surface properties, and compare this value to the appropriate reference value. If the ruggedness is lower than the reference value, the controller 40 maintains the current machining conditions and, if higher than the reference value, the controller 40 lowers the cutting value (shift) or adjusts the machining conditions in other ways, so that ruggedness is minimized. Additionally, the ruggedness is compared to a second reference value, and, if the amount of ruggedness is lower than the second reference value, a judgment is made that the machining time can be shortened without causing problems, and other parameters such as the cutting depth may be increased. Multiple reference values such as those described above may be provided, and the machining conditions may be adjusted in plural stages. Furthermore, machining conditions may also be adjusted continuously in response to the surface properties.

In addition, the judgment unit 49 checks for abnormal distortion in the machined surface. If the clamping device is clamping the workpiece 50 with excessive pressure, or if the pressure is unevenly balanced in a number of locations, abnormal distortion occurs in the workpiece 50. When abnormal distortion is detected, the controller 40 stops the machining, and "Abnormal Distortion" is displayed on the display 52 to alert the operator. This processing will preferably also be carried out when machining first begins.

In the same way as with manual adjustment, adjustment of the measurement and machining conditions is optimally carried out a plurality of times, at appropriate intervals. Additionally, the discharge of the compressed air may be carried out continuously. Optical interference measurement may also be carried out continuously, without any intervals. Surface properties may also be monitored in an ongoing manner, and machining conditions adjusted in response to changes in the surface properties.

In the above manner, machining is carried out with the controller 40 adjusting the machining conditions as necessary, and terminating machining at the point when the amount of machining initially input has been reached. The Z axis spindle 8 is pulled upward and stops.

The above is a description of a preferred embodiment of the present invention. According to the present embodiment, a compressed air blower is provided and a high-speed stream of gas is generated which flows in a constant direction along the surface of the workpiece to the illuminated area, enabling stable and satisfactory on-the-fly optical interference measurement results to be obtained. Consequently, setup changing in which the workpiece is removed from the machining device while machining is in progress and is set on the measurement device is no longer necessary, and both machining time and machining cost can be reduced.

In addition, it is possible to ascertain easily during machining whether or not the machining conditions are satisfactory, and to judge the machining accuracy, enabling improved machining accuracy based on these judgments, and making it possible to prevent defective machining before it occurs.

Also, according to the present embodiment, it is possible to observe distortion caused by the workpiece clamps. This makes it possible to detect abnormal distortion caused by the clamps and thus prevent machining defects in advance at this point, as well.

Additionally, according to the present embodiment, the results of the optical interference measurement can be fed back to the machining conditions, and the machining conditions can be adjusted automatically, enabling the machining accuracy to be improved. Conventionally, adjustments of the machining conditions have been made based on the operator's judgment, with the result that machining accuracy depended on the operator's level of skill. With the present invention, machining can be carried out at a high level of accuracy, regardless of the operator's level of skill. In addition, by adjusting the machining conditions, the machining speed can be increased to the maximum possible range, with the result that the devices of the present embodiment contribute to reducing the machining time at this point.

An example of a variation of the present embodiment is described here. Although in the described example, two nozzles 32 of the compressed air blower 28 are positioned with one on either side of an interference light path 24, the number of nozzles 32 may be set to the most appropriate number necessary for the application; for example, it is possible to provide only one nozzle 32. Also, the protective cover panel may be constituted so that it encompasses the interference light path 24.

Also, although in the above description air is used to form a high-speed gas, other gases may be used as well. Also, the interference light may be conducted using optical fibers.

While in the example optical interference measurement was carried out, other forms of optical measurement may also be carried out. For example, a laser-type indicator may be used to measure the position (height) of the workpiece 50, in which case the present invention may be applied with the same level of effectiveness as in the embodiment described above.

Additionally, although mirror surface finishing was applied in the above description, other types of machining may also be applied within the range of the present invention.

The constitution in which the technology of the first and/or second embodiments is applied in the third embodiment is included in the invention of the present application. Conversely, the constitution in which the technology of the third embodiment is applied in the first and/or second embodiments is also included in the invention of the present application. As described earlier, the first embodiment is not restricted to a lapping device, but may be applied to other types of machining devices as well. Also, the second and third embodiments are not restricted to grinding and cutting machining devices, but may also be applied to other types of machining devices.

What is claimed is:

1. An optical interference measurement device for optically measuring an interference of a target workpiece to be held in a machining device and machined by a machine tool, said optical interference measurement device comprising:

a machine tool having a measurement window which penetrates the machine tool;

interference image formation means for irradiating the machine tool with measurement light from the side opposite to the workpiece to capture a plurality of optical interference images which are present in the range including said measurement window and which have different positional relationships between the workpiece and the measurement window; and image processing means for synthesizing the fringe images of the workpiece obtained in the measurement window area of said plural optical interference images to form a synthesized interference fringe image in which the interference fringe images are consecutive within a predetermined measurement range;

said image processing means eliminating the shadow of the machine tool from the optical interference image on the basis of a reference tool shadow intensity which is the reference size of the optical intensity of the tool shadow corresponding to the tool section in the optical interference image to form said synthesized interference fringe image.

2. The optical interference measurement device according to claim 1, wherein said image processing means utilizes, among picture elements in the identical position of said plural optical interference images, a picture element which has an optical intensity offset from said reference tool shadow intensity as the picture element constituting said synthesized interference fringe image.

3. The optical interference measurement device according to claim 1, wherein said image processing means utilizes, among picture elements in the identical position of said plural optical interference images, a picture element which has an optical intensity at the largest distance from said reference tool shadow intensity as the picture element constituting said synthesized interference fringe image.

4. The optical interference measurement device according to claim 2, wherein said reference tool shadow intensity is uniformly set over the entire optical interference image;

the standard range of the values obtained for the optical intensity of the tool shadow is set as the standard shadow intensity range; and said image processing means utilizes an image element of one reference image among the plurality of optical interference images as the picture element constituting said synthesized interference image, in the event that the picture elements of identical position of the plurality of optical interference images are all included in said reference shadow intensity range.

5. The optical interference measurement device according to claim 2, wherein said reference tool shadow intensity is set separately for the respective positions of the optical interference image, and wherein judgment as to whether or not each picture element of each position of the optical interference image is to be used for said synthesized interference image is made considering the reference tool shadow intensity corresponding to this picture element.

6. The optical interference measurement device according to claim 1, wherein said reference tool shadow intensity is a value previously determined by measurement.

7. The optical interference measurement device according to claim 1, wherein said image processing means processes said synthesized interference fringe image into a binary image, and then calculates the surface profile of the workpiece on the basis of the binary image.

8. A machining device with a measurement function which is provided with the optical interference measurement device described in claim 1 to machine a workpiece by means of the relative movement of the workpiece and a machine tool.

9. An image processing device for an optical interference measurement device which processes optical interference images of a workpiece photographed through a measurement window which penetrates a machine tool of a machining device from the side opposite to the workpiece, said image processing device comprising:

input means for inputting plural optical interference images having respectively different positional relationships between the workpiece and the measurement window; and image processing means for synthesizing the fringe images of the workpiece obtained at the measurement window sections of said plural optical interference images to form a synthesized interference fringe image in which interference fringes are consecutive in a predetermined measurement range, said image processing means eliminating tool shadows from optical interference images on the basis of the reference tool shadow intensity which is the reference size of the optical intensity of the tool shadows corresponding to the tool portions in the optical interference image to form said synthesized interference fringe image.

10. The image processing device according to claim 9, wherein said image processing means utilizes, among picture elements in the identical position of said plural optical interference images, a picture element which has an optical intensity offset from said reference tool shadow intensity as the picture element constituting said synthesized interference fringe image.

11. The image processing device according to claim 9, wherein said image processing means comprises:

a base image memory for storing the base image which is one of said plural optical interference images;

a comparative image memory for sequentially storing the remaining images of said plural optical interference images as comparative images; and a data processor for reading the comparative images stored sequentially in the comparative image memory and then synthesizing a base image and each comparative image to ultimately synthesize all of said plural optical interference images.

12. The image processing device according to claim 11, wherein said data processor utilizes one picture element from the base image or the comparison image for each position of the synthesized image, on the basis of a difference between said reference tool shadow intensity and the optical intensity of a picture element of the base image and a difference between said reference tool shadow intensity and the optical intensity of a picture element in the identical position of the comparative image.

13. The image processing device according to claim 9, wherein said synthesized interference images are output to a display device.

14. The image processing device according to claim 9 which includes a surface profile calculator for calculating the surface profile of the workpiece from said synthesized interference images.

* * * * *

UNITED STATES PATENT AND TRADEMARK OFFICE
CERTIFICATE OF CORRECTION

PATENT NO. : 6,147,764
DATED : November 14, 2000
INVENTOR(S) : Hirohisa Handa

It is certified that error appears in the above-identified patent and that said Letters Patent is hereby corrected as shown below:

Title page,
Item [54], cancel the title and insert the following therefor:
-- OPTICAL INTERFERENCE MEASUREMENT DEVICE, AND MACHINING DEVICE WITH MEASUREMENT FUNCTION EQUIPPED WITH THE MEASUREMENT DEVICE --.

Signed and Sealed this

Twenty-ninth Day of January, 2002

*Attest:*

JAMES E. ROGAN
*Attesting Officer*     *Director of the United States Patent and Trademark Office*